(12) United States Patent
Shiraishi

(10) Patent No.: US 7,598,997 B2
(45) Date of Patent: Oct. 6, 2009

(54) IMAGING APPARATUS AND FOCUS CONTROL METHOD BASED ON A NUMBER OF AUTOMATIC FOCUS SCAN STAGES, AND RECORDING MEDIUM STORING A PROGRAM FOR EXECUTING SUCH A METHOD

(75) Inventor: Kenji Shiraishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 724 days.

(21) Appl. No.: 11/028,307

(22) Filed: Jan. 4, 2005

(65) Prior Publication Data

US 2005/0168620 A1    Aug. 4, 2005

(30) Foreign Application Priority Data

Jan. 14, 2004   (JP)   ............................. 2004-007154
Jun. 3, 2004    (JP)   ............................. 2004-166442

(51) Int. Cl.
    H04N 5/232    (2006.01)
(52) U.S. Cl. ...................................... 348/353
(58) Field of Classification Search ................ 348/345, 348/347, 240.3, 240.99, 353, 354, 356
    See application file for complete search history.

(56) References Cited

U.S. PATENT DOCUMENTS

| | | | |
|---|---|---|---|
| 4,284,335 A | | 8/1981 | Takemae et al. |
| 4,611,244 A | | 9/1986 | Hanma et al. |
| 4,848,884 A | * | 7/1989 | Enomoto .................... 359/696 |
| 5,218,444 A | * | 6/1993 | Mizutani et al. ............ 348/347 |
| 5,235,374 A | * | 8/1993 | Kobayashi et al. ............ 396/80 |
| 5,751,354 A | * | 5/1998 | Suzuki et al. ............... 348/349 |
| 5,899,586 A | | 5/1999 | Kawanami |
| 6,184,931 B1 | | 2/2001 | Kaneda |
| 6,704,054 B1 | | 3/2004 | Hashimoto |
| 6,763,187 B2 | | 7/2004 | Shiraishi |
| 2003/0071908 A1 | | 4/2003 | Sannoh et al. |
| 2003/0071911 A1 | | 4/2003 | Shinohara et al. |
| 2003/0081137 A1 | | 5/2003 | Yamazaki |
| 2003/0146988 A1 | * | 8/2003 | Shiraishi ...................... 348/245 |
| 2003/0169346 A1 | | 9/2003 | Ojima et al. |
| 2003/0197804 A1 | | 10/2003 | Ito |
| 2004/0130632 A1 | | 7/2004 | Shiraishi |
| 2004/0212721 A1 | * | 10/2004 | Watanabe .................... 348/345 |
| 2004/0252224 A1 | | 12/2004 | Shiraishi et al. |
| 2004/0263633 A1 | | 12/2004 | Shinohara et al. |

FOREIGN PATENT DOCUMENTS

| | | |
|---|---|---|
| JP | 54-113334 | 9/1979 |
| JP | 57-146227 | 9/1982 |

(Continued)

*Primary Examiner*—Jason Chan
*Assistant Examiner*—Nicholas G Giles
(74) *Attorney, Agent, or Firm*—Oblon, Spivak, McClelland, Maier & Neustadt, L.L.P.

(57) ABSTRACT

An imaging apparatus achieves a high-speed automatic focus operation and a reduction in power consumption and prevents a miss focus due to an erroneous determination. The imaging apparatus has an automatic focus function, which detects a current position of a focal lens. A limited range near the detected current position of the focal lens is designated as a focus range. A movable range of the focal lens is changed in accordance with the designated focus range.

21 Claims, 26 Drawing Sheets

FOREIGN PATENT DOCUMENTS

| | | |
|---|---|---|
| JP | 9-211298 | 8/1997 |
| JP | 11-133476 | 5/1999 |
| JP | 11-168747 | 6/1999 |
| JP | 11-168748 | 6/1999 |
| JP | 11-168749 | 6/1999 |
| JP | 2000-131598 | 5/2000 |
| JP | 2002-238057 | 8/2002 |
| JP | 2003-87802 | 3/2003 |
| JP | 2003-92699 | 3/2003 |
| JP | 2003-92700 | 3/2003 |
| JP | 2003-189325 | 7/2003 |
| JP | 2003-230039 | 8/2003 |
| JP | 2003-262786 | 9/2003 |
| JP | 3566845 | 6/2004 |

* cited by examiner

IMMEDIATELY AFTER MACRO SETTING

MACRO DISPLAY AFTER EXECUTION OF AF

MACRO DISPLAY AFTER DESIGNATING FOCUS RANGE

AFTER CHANGING FOCUS RANGE

ALARM DISPLAY

NO DESIGNATION OF FOCUS RANGE

DESIGNATED FOCUS RANGE ON WIDE ANGLE SIDE

DESIGNATED FOCUS RANGE ON TELE SIDE

FOCUS IS MAINTAINED AFTER EXECUTION OF AF

FOCUS IS NOT MAINTAINED

FIG.19

| A | A | A | A | A | A | A | A | A | A | A | A | A | A | A | A |
|---|---|---|---|---|---|---|---|---|---|---|---|---|---|---|---|
| A | A | A | A | A | A | A | A | A | A | A | A | A | A | A | A |
| A | A | A | B | B | B | B | B | A | A | A | A | A | A | A | A |
| A | A | A | B | B | B | B | B | B | B | B | A | A | A | A | A |
| A | A | A | B | B | B | C | C | B | B | B | A | A | A | A | A |
| A | A | A | B | B | B | B | B | B | B | B | A | A | A | A | A |
| A | A | A | B | B | B | B | C | C | B | B | A | A | A | A | A |
| A | A | A | B | B | B | B | C | C | B | B | A | A | A | A | A |
| A | A | A | A | A | B | B | C | C | B | B | A | A | A | A | A |
| A | A | A | A | A | A | A | A | A | A | A | A | A | A | A | A |
| A | A | A | A | A | A | A | A | A | A | A | A | A | A | A | A |
| A | A | A | A | A | A | A | A | A | A | A | A | A | A | A | A |

FIG.20

| A | A | A | A | A | A | A | A | A | A | A | A | A | A | A | A |
|---|---|---|---|---|---|---|---|---|---|---|---|---|---|---|---|
| A | A | A | A | A | A | A | A | A | A | A | A | A | A | A | A |
| A | A | A | A | A | A | A | A | A | A | A | A | A | A | A | A |
| A | A | A | A | B | B | B | A | A | A | A | A | A | A | A | A |
| A | A | A | A | B | B | C | B | B | B | B | A | A | A | A | A |
| A | A | A | A | B | B | B | C | B | B | B | A | A | A | A | A |
| A | A | A | A | B | B | B | B | B | B | B | A | A | A | A | A |
| A | A | A | A | A | A | B | B | C | B | B | A | A | A | A | A |
| A | A | A | A | A | A | B | B | C | B | B | A | A | A | A | A |
| A | A | A | A | A | A | A | A | A | A | A | A | A | A | A | A |
| A | A | A | A | A | A | A | A | A | A | A | A | A | A | A | A |
| A | A | A | A | A | A | A | A | A | A | A | A | A | A | A | A |

IMAGING APPARATUS AND FOCUS CONTROL METHOD BASED ON A NUMBER OF AUTOMATIC FOCUS SCAN STAGES, AND RECORDING MEDIUM STORING A PROGRAM FOR EXECUTING SUCH A METHOD

BACKGROUND OF THE INVENTION

1. Field of the Invention

The present invention generally relates to an imaging technique and, more particularly, to an automatic focus system of an imaging apparatus such as a digital camera.

2. Description of the Related Art

Generally, an electronic imaging apparatus such as a digital still camera is provided with an automatic focus (AF) system, which automatically performs a focusing operation. As a method of automatic focusing, Japanese Patent Publication No. 39-5265 discloses a control method, which is referred to as a mountain-climbing AF control and used widely. In the mountain-climbing AF control, an integral value of high-frequency components or differences in intensity between adjacent pixels is acquired from an image signal obtained on an individual field or frame basis so as to set the thus-acquired integral value to an AF evaluation value which indicates a degree of focus. Since edge portions of a photographing object are sharp in a focused state, the AF evaluation value is large. On the other hand, the AF evaluation value is small in an unfocused state. When an AF control is being performed, a focal lens, which constitutes a part of an imaging optical system, is moved so as to sequentially acquire the AF evaluation value, and, then, the lens if stopped when the AF evaluation value is at a maximum where it is regarded as a focal point.

Since an accurate focus is required generally for an imaging apparatus such as a digital still camera which takes a still picture as compared with an imaging apparatus such as a video camera which takes a motion picture, an AF operation is performed each time of taking a picture or a focusing operation is repeatedly performed always in a recording mode.

However, if the mountain-climbing control AF is applied in each shoot, an amount of movement of the focus lens is large in a distance measurement range in a macro mode or a telephoto side of a zoom camera, which results in a problem in that a time lag, that is, a shutter release time lag, is generated from a time when the operator performs a shoot start request until the shoot is actually performed.

Additionally, in a digital still camera equipped with a zoom lens of which zoom magnification can be changed by changing a focal distance, it is possible to select one of two kinds of picture range, one is a macro mode which uses, as a picture range, a distance range closer than a predetermined distance and the other is a normal picture mode which uses, as a picture range, a distance range farther than the above-mentioned predetermined distance. However, in the macro mode where a distance between a photographing object and the focal lens is extremely small and an amount of movement of the focal lens in a total distance measurement range is large, and, thus, the above-mentioned shutter release time lag is generated, which results in a problem that the shutter is not released at the right moment.

Furthermore, since the movement of the focal lens by a motor is always performed as an AF scan operation on an entire object area each time of taking a picture, a large amount of electric power is consumed, which results in decrease in a service life of a battery cell, which is normally used as a power source. Additionally, if, for example, a picture of an object is taken with wire-netting in between, the AF evaluation value has a peak at the wire-netting when an entire object area is subjected to the AF scan operation, which results in an erroneous operation such that a photographing object is faded. As measures for solving such a problem, Japanese Laid-Open Patent Application No. 54-113334 suggests a technique to limit a range to perform a focal determination. Additionally, Japanese Laid-Open Patent Applications No. 2003-230039, No. 2003-262786 and No. 9-211298 disclose techniques to limit the AF scan range, that is, a range of movement of a focal lens by a motor, to a specific range.

Specifically, Japanese Laid-Open Patent Application No. 54-113334 discloses a technique to perform a focal position detection by selecting a desired distance range from among all distance ranges, but only data in the desired range from among all scan area is used, which may be effective in preventing an erroneous determination but there is little contribution to a reduction in a time period spent on the AF operation and a reduction in an electric power consumption. Japanese Laid-Open Patent Application No. 2003-230039 discloses a technique to perform an AF scan while limiting a focus range when a release operation is performed while operating a specific button. The technique of this patent document is to limit the AF scan range to a predetermined range. Japanese Laid-Open Patent Application No. 2003-262786 discloses a technique to divide a focus range and to perform an AF scan on a designated one of the divided ranges. The technique of this patent document divides a focus range, and performs an AF scan on one of the divided focus ranges so as to perform an AF scan on the other divided focus range only when the focusing operation to said one of the divided focus range cannot be completed. Japanese Laid-Open Application No. 9-211298 disclose a technique to select and set whether to divide a range of movement of a focal lens into a motion permitted area and a motion prohibited area so as to prevent the focal lens to move into the motion prohibited area.

SUMMARY OF THE INVENTION

It is a general object of the present invention to provide an improved and useful imaging apparatus in which the above-mentioned problems are eliminated.

A more specific object of the present invention is to provide an imaging apparatus and a focusing method, which achieve a high-speed automatic focusing operation and a reduction in power consumption and prevent a miss focus due to an erroneous determination so as to improve convenience of use.

Another object of the present invention is to provide an imaging apparatus and a focus control method, which achieve a high-speed automatic focusing operation and a reduction in power consumption and contribute to stabilization of a result of the automatic focus operation.

In order to achieve the above-mentioned objects, there is provided according to the present invention an imaging apparatus having an automatic focus function, comprising: focal lens position detecting means for detecting a current position of a focal lens; focus range designating means for designating as a focus range a limited range near the current position of the focal lens detected by the focal lens position detecting means; and focal lens movable range changing means for changing a movable range of the focal lens in accordance with the focus range designated by the focus range designating means.

According to the above-mentioned invention, a high-speed automatic focusing operation and a reduction in power consumption can be achieved, and a miss focus due to an erroneous determination can be prevented, which improves convenience of use. That is, a time required for AF can be reduced by designating the AF scan range, and power consumption can be reduced by narrowing the range for operating the focus motor. Further, focus can be made to a photographing object in a desired range even when the photographing object has a large depth that provides a plurality of peaks when a mountain climbing AF is performed.

The imaging apparatus according to the present invention may further comprise: previous focus result storing means for storing a result of a previous focusing operation; and alarm displaying means for displaying an alarm when no focus is acquired according to the result of a previous focusing operation that has been stored in the previous focus result storing means when designation of the focal range is made by the focus range designation means. Accordingly, photographing can be effectively prevented from being performed under an erroneously focused state. That is, by announcing a user that an area is limited under an unfocused state due to a previous AF result, the user recognizes the state, which can prevent repetition of photographing under the unfocused state.

The imaging apparatus according to the present invention may further comprise focus range displaying means for displaying the focus range at present. Accordingly, a failure in photographing can be effectively prevented. That is, since the focus range is displayed, a failure in photographing can be suppressed. Additionally, when a range is not limited, it is indicated that the entire range is the focus area, and, thus, it can be recognized beforehand that a time lag in the focusing operation will be increased.

The imaging apparatus according to the present invention may further comprise focus range position changing means for changing a position of the limited focus range designated by the focus range designating means. According to the above-mentioned structure, a high-speed automatic focusing operation and a reduction in power consumption can be achieved, and a miss focus due to an erroneous determination can be prevented, which improves convenience of use. Additionally, it can easily respond also to position change of a photographing object or a change in photographing conditions.

The imaging apparatus according to the present invention may further comprise focus range designation canceling means for canceling the setting of the limited focus range designated by the focus range designating means. According to the above-mentioned structure, a high-speed automatic focusing operation and a reduction in power consumption can be achieved further effectively, and a miss focus due to an erroneous determination can be prevented, which improves convenience of use. Additionally, it can be respond to a case where AF is desired to be performed again for all areas.

The imaging apparatus according to the present invention may further comprise macro mode switching means for switching between a macro mode and a normal mode, the macro mode for taking a picture of a photographing object at an extremely short distance, the normal mode for taking a picture of a photographing object at a normal distance larger than the extremely short distance, wherein the focus range designating means is permitted to designate the focus range only when the macro mode is set. Accordingly, a high-speed AF operation and a reduction in power consumption can be achieved effectively by matching the photographing mode between the normal mode and the macro mode for photographing a picturing object at an extremely short distance, and a false focus due to an erroneous determination can be prevented, which improves usability. That is, in the normal photographing mode, it can easily respond to a change in a picturing object by eliminating designation of a focus range, and a possibility of failure in photographing can be reduced.

The imaging apparatus according to the present invention may further comprise: macro mode switching means for switching between a macro mode and a normal mode, the macro mode for taking a picture of a photographing object at an extremely short distance, the normal mode for taking a picture of a photographing object at a normal distance larger than the extremely short distance; and means for automatically canceling, when the focus range is designated by the focus range designating means, the designation of the focus range. Accordingly, a high-speed AF operation and a reduction in power consumption can be achieved effectively by matching the photographing mode between the normal mode and the macro mode for photographing a picturing object at an extremely short distance, and a false focus due to an erroneous determination can be prevented, which improves usability. That is, in the ON/OFF switching of the macro mode, there is high possibility of not only the photographing range having been changed but also a picturing object having been changed, and, thus, if is eliminated to forget a cancellation of designation of the range by automatically canceling the limitation of the range. Thereby, a possibility of failure in photographing can be effectively reduced.

The imaging apparatus according to the present invention may further comprise: zooming means for changing a focal distance of an imaging lens; zoom magnification changing means for changing a zoom magnification achieved by the zooming means; and means for automatically canceling, when the focus range is designated by the focus range designating means, the designation of the focus range. Accordingly, a high-speed AF operation and a reduction in power consumption can be achieved effectively by corresponding to a change in a zoom position of the zoom lens, and a false focus due to an erroneous determination can be prevented, which improves usability. That is, in such a case there is a high possibility that a photographing condition of a picturing object has changed, and, thus, it is possible that the photographing is failed when a picture is taken without change. Thus, the possibility of failure in photographing can be suppressed by canceling the limitation of the range.

The imaging apparatus according to the present invention may further comprise: zooming means for changing a focal distance of an imaging lens; and zoom magnification changing means for changing a zoom magnification achieved by the zooming means; and means for changing the focus range in accordance with the zoom magnification set by the zoom magnification changing means.

Accordingly, a high-speed AF operation and a reduction in power consumption can be achieved effectively by corresponding to a change in a zoom position of the zoom lens, and a false focus due to an erroneous determination can be prevented, which improves usability. That is, although the shutter release time lag is prevented from being changed due to a change in the zoom magnification by causing an amount of operation of a focus motor to be substantially constant, which improves usability, there is a possibility of reducing the focus detection range and a there may be a problem associated with a focus rate. Thus, it is possible to prevent the focus rate from decreasing while preventing a large increase in the focusing time on the telephoto side by changing the focus detection in response to a zoom position in such a degree that the focusing time does not change greatly.

The imaging apparatus according to the present invention may further comprise: expanded distance re-measurement selecting means for selecting whether to perform a distance measurement again by expanding a distance measurement range when a focusing operation is performed in a state where the limited range is designated by the focus range designating means; and means for performing the focusing operation again with a range larger than the focus range set by the focus range designating means when no focus is acquired with the limited range set by the focus range designating means and the expanded distance measurement with the expanded distance is permitted by the expanded distance re-measurement selecting means. Accordingly, it is possible to flexibly and effectively respond to a case in which a focus position cannot be detected. That is, by performing the AF operation immediately after a recordable state is set, an effect of reducing a shutter release time lag can be obtained.

Additionally, there is provided according to another aspect of the present invention a focusing method of an imaging apparatus, comprising: a focal lens position detecting step of detecting a current position of a focal lens; a focus range designating step of designating as a focus range a limited range near the current position of the focal lens; and a focal point detecting step of detecting a focal point by moving the focal lens within a range corresponding to the focus range designated in the focus range designating step.

According to the above-mentioned invention, a high-speed AF operation and a reduction in power consumption can be achieved effectively in an imaging apparatus, and a false focus due to an erroneous determination can be prevented, which improves usability.

Additionally, there is provided according to another aspect of the present invention a computer readable recording medium storing a program for causing a computer to execute: a focal lens position detecting procedure for detecting a current position of a focal lens; a focus range designating procedure for designating as a focus range a limited range near the current position of the focal lens; and a focal point detecting procedure for detecting a focal point by moving the focal lens within a range corresponding to the focus range designated in the focus range designating step.

According to the above-mentioned invention, a high-speed AF operation and a reduction in power consumption can be achieved effectively in an imaging apparatus, and a false focus due to an erroneous determination can be prevented, which improves usability.

Additionally, there is provided according to another aspect of the present invention an imaging apparatus in which one of a macro mode and a normal mode is selectable, the macro mode for setting a photographing range to a distance range shorter than a predetermined range, the normal mode for setting the photographing range to a distance longer than the predetermined range, the imaging apparatus comprising: focus control means for sequentially detecting a focal point while moving a focal lens and stopping the focal lens at the focal point so as to perform an automatic focusing operation; and range control means for causing the focus control means to perform the automatic focusing operation by limiting a movable range of the focal lens to a range narrower than an entire focus range with an immediately preceding focal point when taking a picture in the macro mode and a predetermined condition is satisfied.

According to the above-mentioned invention, a high-speed automatic focusing operation can be achieved when the macro mode is selected in the imaging apparatus which can be selectably switched between the macro mode for taking a picture of a picturing object at an extremely short distance and the normal photographing mode for taking a picture of a picturing object at a normal distance, and power consumption can be reduced, and, further, an automatic focusing on a picturing object in a desired distance range can be achieved.

In the imaging apparatus according to the present invention, the predetermined condition may include that the automatic focus operation was performed at least one time after the macro mode was set, and the range control means includes means for causing the focusing operation to be performed on the limited range when the predetermined condition is satisfied. Accordingly, a failure in focusing in an automatic focusing operation immediately after setting the macro mode can be effectively prevented, and a reduction in a time spent on the automatic focusing operation and energy saving thereafter can be effectively achieved.

In the imaging apparatus according to the above-mentioned invention, the range control means may includes: means for monitoring a focus state in the focus control means; and means for causing the focusing operation on the limited range when the predetermined condition is satisfied, the predetermined condition including that a focus state after an immediately preceding focusing operation is maintained base on the means for monitoring. Accordingly, especially when a focused state is maintained from the previous automatic focusing operation, a reduction of a time spent on the automatic focusing operation is effectively achieved, and a focus failure can be effectively prevented, which provides an easier operation and photographing with less failure.

The imaging apparatus according to the above-mentioned invention may further comprise distance measurement means for measuring a distance to a photographing object, wherein the range control means comprises: means for monitoring a change in the distance measured by the distance measurement means; and means for causing the focusing operation on the limited range when the predetermined condition is satisfied, the predetermined condition including that the change in the distance after an immediately preceding automatic focusing operation is equal to or less than a predetermined value base on the monitoring by the means for monitoring. Accordingly, especially when a change in a distance to a picturing object from a previous focusing operation is small, a reduction of a time spent on the automatic focusing operation is effectively achieved, and a focus failure can be effectively prevented, which provides an easier operation and photographing with less failure.

The imaging apparatus according to the above-mentioned invention may further comprise brightness distribution measuring means for measuring a brightness distribution in a picture screen, wherein the range control means may comprise: means for monitoring a change in the brightness distribution measured by the brightness distribution measuring means; and means for causing the focusing operation on the limited range when the predetermined condition is satisfied, the predetermined condition including that the change in the brightness distribution after an immediately preceding automatic focusing operation is equal to or less than a predetermined amount base on the monitoring by the means for monitoring. Accordingly, especially when a change in a brightness distribution from a previous automatic focusing operation is small, a reduction of a time spent on the automatic focusing operation is effectively achieved, and a focus failure can be effectively prevented, which provides an easier operation and photographing with less failure.

The imaging apparatus according to the above-mentioned invention may further comprise an imaging optical system using a zoom optical system that optically changes a zoom magnification, wherein the range control means comprises: means for monitoring a change in the zoom magnification in the imaging optical system; and means for causing the focusing operation to be performed on an entire focus range when the zoom magnification has changed based on the monitoring of the means for monitoring. Accordingly, especially when a zoom magnification has changed, a reduction of a time spent on the automatic focusing operation and energy saving are effectively achieved, and a focus failure can be further effectively prevented, which provides an easier operation and photographing with less failure.

Additionally, there is provided according to another aspect of the present invention an imaging apparatus in which one of a macro mode and a normal mode is selectable, the macro mode for setting a photographing range to a distance range shorter than a predetermined range, the normal mode for setting the photographing range to a distance longer than the predetermined range, the imaging apparatus comprising: focus control means for sequentially acquiring from an image signal an automatic focus evaluation value, which is acquired in correspondence with sharpness of an edge portion of a photographing object image, and stopping the focal lens at a focal point being set to a maximum point of the automatic focus evaluation value so as to perform an automatic focusing operation; and range control means for causing the focus control means to perform the automatic focusing operation by limiting a movable range of the focal lens to a range narrower than an entire focus range with an immediately preceding focal point when taking a picture in the macro mode and a predetermined condition is satisfied.

According to the above-mentioned invention, a high-speed automatic focusing operation can be achieved when the macro mode is selected in the imaging apparatus which has a focusing function using an AF evaluation value and can be selectably switched between the macro mode for taking a picture of a picturing object at an extremely short distance and the normal photographing mode for taking a picture of a picturing object at a normal distance, and power consumption can be reduced, and, further, an automatic focusing on a picturing object in a desired distance range can be achieved.

In the imaging apparatus according to the above-mentioned invention, the predetermined condition may include that the automatic focus operation was performed at least one time after the macro mode was set, and the range control means includes means for causing the focusing operation to be performed on the limited range when the predetermined condition is satisfied. Accordingly, a failure in focusing in an automatic focusing operation immediately after setting the macro mode can be effectively prevented, and a reduction in a time spent on the automatic focusing operation and energy saving thereafter can be effectively achieved.

In the imaging apparatus according to the present invention, the range control means may include: means for monitoring a focus state in the focus control means; and means for causing the focusing operation on the limited range when the predetermined condition is satisfied, the predetermined condition including that a focus state after an immediately preceding focusing operation is maintained base on the means for monitoring. Accordingly, especially when a focus state is maintained from the previous automatic focusing operation, a reduction of a time spent on the automatic focusing operation is effectively achieved, and a focus failure can be effectively prevented, which provides an easier operation and photographing with less failure.

The imaging apparatus according to the above-mentioned invention may further comprise distance measurement means for measuring a distance to a photographing object, wherein the range control means may comprise: means for monitoring a change in the distance measured by the distance measurement means; and means for causing the focusing operation on the limited range when the predetermined condition is satisfied, the predetermined condition including that the change in the distance after an immediately preceding automatic focusing operation is equal to or less than a predetermined value base on the monitoring by the means for monitoring. Accordingly, especially when a change in a distance to a picturing object from a previous focusing operation is small, a reduction of a time spent on the automatic focusing operation is effectively achieved, and a focus failure can be effectively prevented, which provides an easier operation and photographing with less failure.

The imaging apparatus according to the above-mentioned invention may further comprise brightness distribution measuring means for measuring a brightness distribution in a picture screen, wherein the range control means comprises: means for monitoring a change in the brightness distribution measured by the brightness distribution measuring means; and means for causing the focusing operation on the limited range when the predetermined condition is satisfied, the predetermined condition including that the change in the brightness distribution after an immediately preceding automatic focusing operation is equal to or less than a predetermined amount base on the monitoring by the means for monitoring. Accordingly, especially when a change in a brightness distribution from a previous automatic focusing operation is small, a reduction of a time spent on the automatic focusing operation is effectively achieved, and a focus failure can be effectively prevented, which provides an easier operation and photographing with less failure.

In the imaging apparatus according to the above-mentioned invention, the range control means may comprises: means for monitoring the automatic focus value in the focus control means; and means for causing the focusing operation on the limited range when the predetermined condition is satisfied, the predetermined condition including that the change in the automatic focus evaluation value after an immediately preceding automatic focusing operation is equal to or less than a predetermined value base on the monitoring by the means for monitoring. Accordingly, especially when a change in an automatic focus evaluation value from a previous automatic focusing operation is small, a reduction of a time spent on the automatic focusing operation is effectively achieved, and a focus failure can be effectively prevented, which provides an easier operation and photographing with less failure.

The imaging apparatus according to the above-mentioned invention may further comprise an imaging optical system using a zoom optical system that optically changes a zoom magnification, wherein the range control means may comprise: means for monitoring a change in the zoom magnification in the imaging optical system; and means for causing the focusing operation to be performed on an entire focus range when the zoom magnification has changed based on the monitoring of the means for monitoring. Accordingly, especially when a zoom magnification has changed, a reduction of a time spent on the automatic focusing operation and energy saving are effectively achieved, and a focus failure can be further effectively prevented, which provides an easier operation and photographing with less failure.

Additionally, there is provided according to another aspect of the present invention a focus control method of an imaging apparatus in which one of a macro mode and a normal mode is selectable, the macro mode for setting a photographing range to a distance range shorter than a predetermined range, the normal mode for setting the photographing range to a distance longer than the predetermined range, the focus control method comprising: performing an automatic focusing operation by sequentially detecting a focal point while moving a focal lens, which constitute at least a part of an imaging optical system of the imaging apparatus, and stopping the focal lens at the focal point; and causing the automatic focusing operation to be performed by limiting a movable range of the focal lens to a range narrower than an entire focus range with an immediately preceding focal point set as a reference when the macro mode is set and a predetermined condition is satisfied.

According to the above-mentioned invention, a high-speed automatic focusing operation can be achieved when the macro mode is selected in the imaging apparatus which can be selectably switched between the macro mode for taking a picture of a picturing object at an extremely short distance and the normal photographing mode for taking a picture of a picturing object at a normal distance, and power consumption can be reduced, and, further, an automatic focusing on a picturing object in a desired distance range can be achieved.

Additionally, there is provided according to another aspect of the present invention a focus control method of an imaging apparatus in which one of a macro mode and a normal mode is selectable, the macro mode for setting a photographing range to a distance range shorter than a predetermined range, the normal mode for setting the photographing range to a distance longer than the predetermined range, the focus control method comprising: sequentially acquiring from an image signal an automatic focus evaluation value, which is acquired in correspondence to sharpness of an edge portion of a photographing object image while moving a focal lens, which constitute at least a part of an imaging optical system; controlling an automatic focusing operation by stopping the focal lens at a focal point being set as a maximum point of the automatic focus evaluation value; and causing the automatic focusing operation to be performed by limiting a movable range of the focal lens to a range narrower than an entire focus range with an immediately preceding focal point set as a reference when the macro mode is set and a predetermined condition is satisfied.

According to the above-mentioned invention, a high-speed automatic focusing operation can be achieved when the macro mode is selected in the imaging apparatus which has a focusing function using an AF evaluation value and can be selectably switched between the macro mode for taking a picture of a picturing object at an extremely short distance and the normal photographing mode for taking a picture of a picturing object at a normal distance, and power consumption can be reduced, and, further, an automatic focusing on a picturing object in a desired distance range can be achieved.

Additionally, there is provided according to another aspect of the present invention a computer readable recording medium storing a program for causing a computer to perform a focus control method of an imaging apparatus in which one of a macro mode and a normal mode is selectable, the macro mode for setting a photographing range to a distance range shorter than a predetermined range, the normal mode for setting the photographing range to a distance longer than the predetermined range, the focus control method comprising: performing an automatic focusing operation by sequentially detecting a focal point while moving a focal lens, which constitute at least a part of an imaging optical system of the imaging apparatus, and stopping the focal lens at the focal point; and causing the automatic focusing operation to be performed by limiting a movable range of the focal lens to a range narrower than an entire focus range with an immediately preceding focal point set as a reference when the macro mode is set and a predetermined condition is satisfied.

Further, there is provided according to another aspect of the present invention a computer readable recording medium storing a program for causing a computer to perform a focus control method of an imaging apparatus in which one of a macro mode and a normal mode is selectable, the macro mode for setting a photographing range to a distance range shorter than a predetermined range, the normal mode for setting the photographing range to a distance longer than the predetermined range, the focus control method comprising: sequentially acquiring from an image signal an automatic focus evaluation value, which is acquired in correspondence to sharpness of an edge portion of a photographing object image while moving a focal lens, which constitute at least a part of an imaging optical system; controlling an automatic focusing operation by stopping the focal lens at a focal point being set as a maximum point of the automatic focus evaluation value; and causing the automatic focusing operation to be performed by limiting a movable range of the focal lens to a range narrower than an entire focus range with an immediately preceding focal point set as a reference when the macro mode is set and a predetermined condition is satisfied.

Other objects, features and advantages of the present invention will become more apparent from the following detailed description when read in conjunction with t accompanying drawings.

BRIEF DESCRIPTION OF THE DRAWINGS

FIG. 19 is an illustration of the blocks shown in FIG. 17 by classifying them into three categories according to brightness data;

FIG. 20 is an illustration of the blocks shown in FIG. 18 by classifying them into three categories according a brightness data value;

DETAILED DESCRIPTION OF THE PREFERRED EMBODIMENTS

Figure 1:
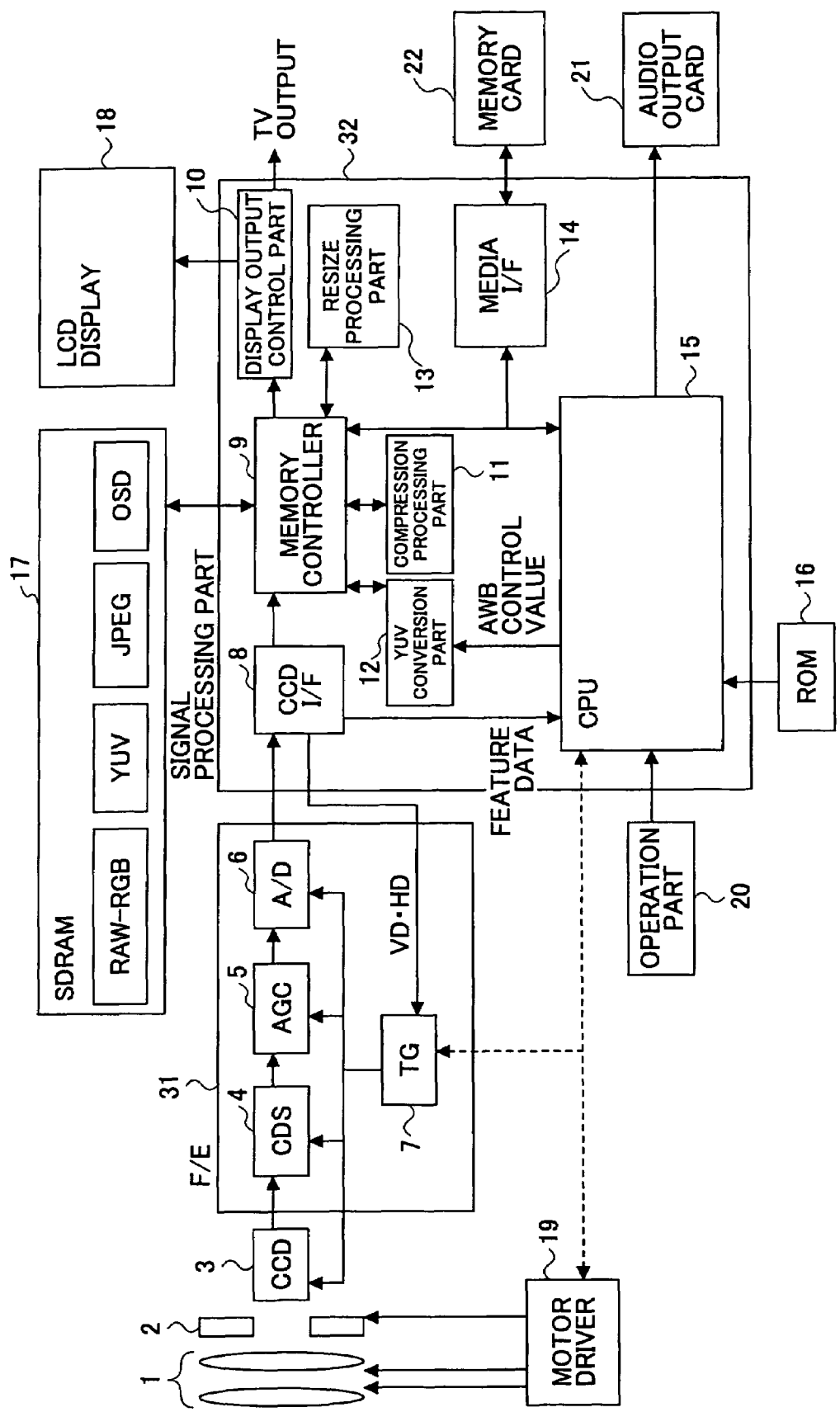
FIG. 1 is a block diagram of an outline of an entire system of the digital still camera, which is an imaging system.
Figure 2:
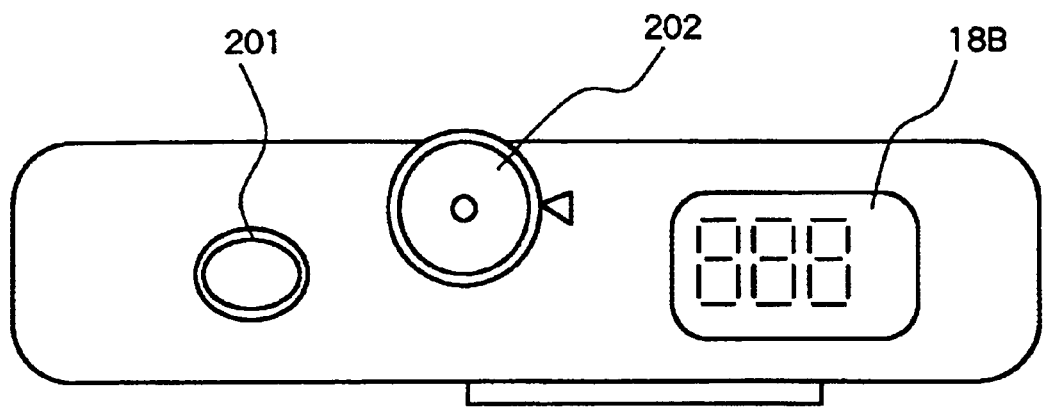
FIG. 2 is an illustrative plan view of the digital still camera.
Figure 3:
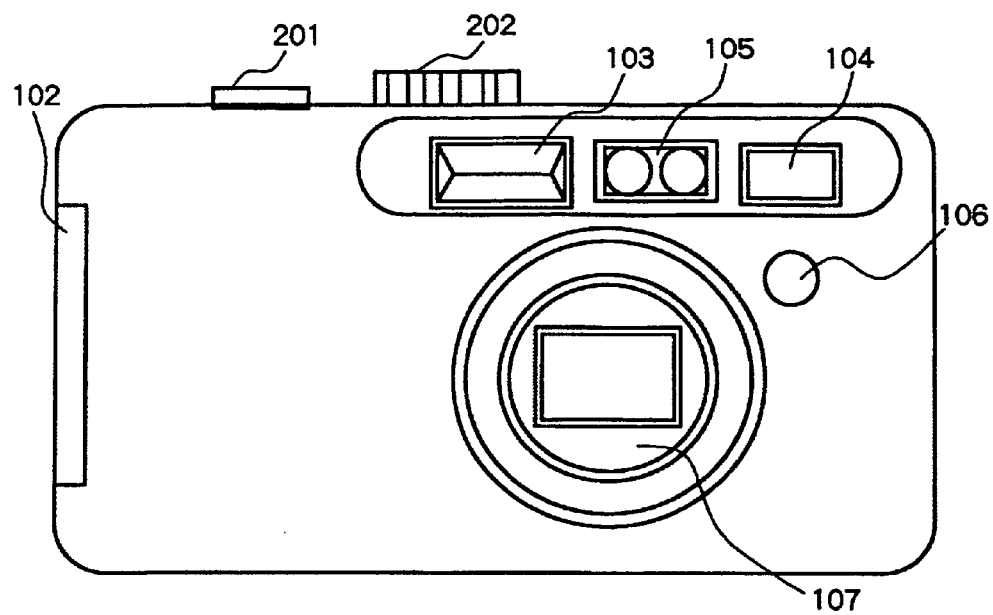
FIG. 3 is an illustrative front view of the digital still camera.
Figure 4:
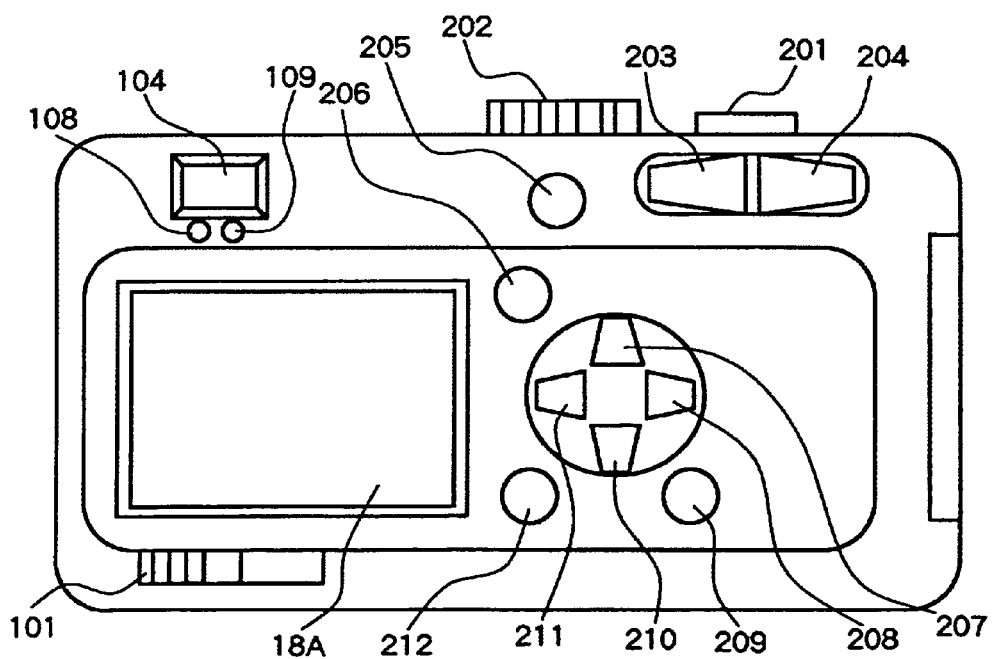
FIG. 4 is an illustrative rear view of the digital still camera.

A description will now be given, with reference to the drawings, of an imaging apparatus according to a first embodiment of the present invention. The imaging apparatus according to the first embodiment of the present invention is a digital still camera to which the present invention is applied. FIG. 1 is a block diagram showing an outline of an entire system of the digital still camera, which is an imaging system. FIG. 2 is an illustrative plan view of the digital still camera. FIG. 3 is an illustrative front view of the digital still camera. FIG. 4 is an illustrative rear view of the digital still camera.

The digital still camera shown in FIG. 1 comprises: an imaging lens system 1; a mechanical shutter 2; a solid imaging element (charge coupled device) 3; a correlation double sampling (CDS) circuit 4; an automatic gain control (AGC) circuit 5; an analog-to-digital (A/D) converter 6; a timing generator (TG) 7; a CCD interface (CCD-I/F) 8; a memory controller 9; a display-output control part 10, a compression processing part 11, a YUV conversion part 12, a resizing processing part 13; a media interface (media I/F) 14; a central processing unit (CPU) 15; a read only memory (ROM) 16; a frame memory (SDRAM) 17; a liquid crystal display (LCD) display 18, a motor driver 19; an operation part 20; an audio output unit 21; and a memory card 22.

The CDS circuit 4, the AGC circuit 5, the A/D converter 6 and the timing generator 7 together constitute a signal processing part 31 of a front end (F/E), and the CCD interface 8, the memory controller 9, the display output control part 10, the compression processing part 11, the YUV transducer 12, the resizing processing part 13, the media interface 14 and the CPU 15 are mounted in a digital-signal-processing IC (integrated circuit) 32. The imaging lens system 1 is an optical system for forming an optical image of a photographing object on a light-receiving surface of the CCD solid imaging element 3. The mechanical shutter 2 is interposed in an optical path between the imaging lens system 1 and the CCD solid imaging element so as to open and close the optical path to control exposure of the CCD solid imaging element 3. The CCD solid imaging element 3 converts the optical image incident on the light-receiving surface in an exposed state into an electric signal, and temporarily retains the optical image and outputs and transfers the electric signal as image data. The CDS circuit 4, the AGC circuit 5, the A/D converter 6 and the timing generator 7 together constitute the signal processing part 31, which processes the output signal of the CCD solid imaging element 3 in a front end. The CDS circuit 4 carries out a correlation double sampling of the output image signal of the CCD solid imaging element 3. The AGC circuit 5 carries out an automatic gain control AGC on the correlation double sampling output of the CDS circuit 4. The A/D converter 6 converts the analog output of the AGC circuit 5 into digital data.

The timing generator 7 is responsive to a VD (vertical synchronization drive signal) and an HD signal (horizontal synchronization drive signal), which are synchronization drive signals given by the CCD interface 8 of the digital signal processing IC (hereinafter, referred to as signal processing IC) 32 and cooperates with the CPU 15 so as to provide a timing signal to the CCD solid imaging element 3, the CDS circuit 4, the AGC circuit 5 and the A/D converter 6 to cause those parts to appropriately synchronize with each other. The signal processing IC 32 stores in the frame memory 17 digital image data given through the A/D converter 6 of the signal processing part 31 in accordance with a control of the CPU 15. The signal processing IC 32 applies necessary signal processing such as compression and YUV conversion to the digital image data and also stores the processed data in the frame memory 17. The signal processing IC 32 displays on the LCD displays 18 the image data given from the A/D converter 6 or retrieved from the frame memory 17. Additionally, the signal processing IC 32 performs a compression process, a YUV conversion process and a resizing process of the image data given from the A/D converter 6 or retrieved from the frame memory 17. Further, the signal processing IC 32 stores the digital image data, retrieved from the frame memory 17, in the memory card 22 through the media interface 14.

The CCD interface 8 receives the digital image data given from the A/D converter 6 of the signal processing part 31, and stores the received data in the frame memory 17 through the memory controller 9. The memory controller 9 controls various kinds of data to store in the frame memory 17 or read out from the frame memory 17 in accordance with a control of the CPU 15, the various kinds of data including original RGB (RAW-RGB) data given through the CCD interface 8, YUV data converted by the YUV conversion part 12, and JPEG data and OSD image data that have been compressed by the compression processing part 11 according to the JPEG (Joint Photographic Experts Group) method. The display output control part 10 displays image data read out from the frame memory 17, and outputs a TV output for causing an external TV (television), etc., to display the image data. The compression processing part 11 compresses the image data given from the A/D converter 6 or taken out from the frame memory 17 in accordance with a predetermined compression method such as, for example, the JPEG method. The YUV conversion part 12 performs a YUV conversion on the image data, which was given from the A/D converter 6 or was taken out from the frame memory 17, in accordance with an automatic white balance (AWB) control value given from the CPU 15. The resizing processing part 13 resizes the image data, which was given from the A/D converter 6 or was taken out from the frame memory 17. The media interface 14 writes the image data, which was given from the A/D converter 6 or was taken out from the frame memory 17, in the memory card 22 according to a control of the memory controller 9 and the CPU 15.

Namely, the memory controller 9 stores in the frame memory 17 the image data given from the A/D converter 6, and retrieves the image data from the frame memory 17 and provides the image data to be displayed on the LCD display 18 through the display output control part 10. The memory controller also retrieves the image data from the frame memory 17 and applies the compression process by the compressing processing part 11, the YUV conversion process by the YUV conversion part 12 and the resizing process by the resize processing part 13, and writes the data after the processing in the frame memory 17, and further retrieves the data from the frame memory 17 and write the data in the memory card 22. The ROM 16 stores the operating program of the CPU 15, data, etc., and the CPU 15 performs various kinds of processing associated with a photography operation according to the program and data read from the ROM 16. The frame memory 17 is a semiconductor memory such as a synchronous dynamic random access memory (SDRAM), and stores original RGB data, the YUV-converted YUV data and the JPEG-compressed JPEG data and the OSD image data. The LCD display 18 is a display device such as a liquid crystal display device or the like, and displays the image data, which is supplied from the A/D converter 6 or retrieved from the frame memory 17 and supplied through the display output control part 10, and further displays necessary information thereon.

Based on a control of the CPU 15, the motor driver 19 drives a lens drive motor (not shown) of the imaging lens system 1 for focusing, zooming, etc., and drives a shutter drive motor (not shown) of the mechanical shutter 2 in association with the timing generator 7 for shutter opening/closing operation. The operation unit 20 includes a release switch for instructing a shoot, a mode switch for switching modes, and at least a part of other switches, keys, levers, dials and the like, and is operated to supply to the CPU 15 an operation instruction, a setting instruction, a selection instruction to the digital still camera. The audio output unit 21 generates a voice and sound such as an alarming sound, a voice announcement or the like. The memory card 22 is a small IC memory type recording medium equipped with a semiconductor non-volatile memory such as a flash memory, and is used as a removable external recording medium to the digital still camera. The memory card 22 is used, for example, by being removably attached to a slot provided in the digital still camera. The memory card 22 retrieves the image data, which was compressed according to the JPEG method in the frame memory 17 through the memory controller 9 in accordance with a control of the CPU 15, and saves the image data as a result of photographing.

Additionally, in FIGS. 2 through 4, the digital still camera is provided with an LCD monitor 18A on a rear surface of a body thereof and a sub LCD 18B is arranged on a top surface of the body. The LCD monitor 18A and the sub LCD 18B constitute the LCD display 18 shown in FIG. 1. The LCD monitor 18A mainly displays an image, and sub LCD 18B mainly displays various symbols indicating a film counter, a date/time and an operating state. Moreover, a shutter release 201 and a mode dial 202 are arranged on the top face of the body. Arranged on the back surface of the body are a wide side (WIDE) zoom switch 203, a telephoto side (TELE) zoom switch 204, a self-timer/cancel switch 205, a menu switch 206, a top/stroboscope switch 207, a right switch 208, a display switch 209, a bottom/macro a switch 210, a left/image check switch 211 and an OK switch 212, which together constitute the operation part shown in FIG. 1. A power supply switch 101 is arranged on a lower part of the back surface of the body. A right side surface of the body when viewing a photographing object is provided with a memory card/battery lid 102, which covers an accommodating part of the memory card 22 such as an SD card and a battery cell as a power source. Arranged on a front surface of the body are a stroboscope light-emitting part 103, an objective surface of an optical finder 104, a distance measurement unit 105, a remote control light-receiving part 106 and a mirror body unit 107 of a photo lens. Also arranged on the back surface of the body are an ocular part of the optical finder 104, an AF indicating light-emitting diode (LED) 108 and a stroboscope indicating LED 109.

It should be noted that the above-mentioned parts, mainly circuit parts, realize the following means under controls of the CPU 15: focal lens position detecting means for detecting a current position of a focal lens; focus range designating means for designating as a focus range a limited range near the current position of the focal lens detected by the focal lens position detecting means; focal lens movable range changing means for changing a movable range of the focal lens in accordance with the focus range designated by the focus range designating means; previous focus result storing means for storing a result of a previous focusing operation; and alarm displaying means for displaying an alarm when no focus is acquired according to the result of a previous focusing operation that has been stored in the previous focus result storing means when designation of the focal range is made by the focus range designation means; focus range displaying means for displaying the focus range at present; focus range position changing means for changing a position of the limited focus range designated by the focus range designating means; focus range designation canceling means for canceling the setting of the limited focus range designated by the focus range designating means; macro mode switching means for switching between a macro mode and a normal mode, the macro mode for taking a picture of a photographing object at an extremely short distance, the normal mode for taking a picture of a photographing object at a normal distance larger than the extremely short distance; macro mode switching means for switching between a macro mode and a normal mode, the macro mode for taking a picture of a photographing object at an extremely short distance, the normal mode for taking a picture of a photographing object at a normal distance larger than the extremely short distance; means for automatically canceling, when the focus range is designated by the focus range designating means, the designation of the focus range; zooming means for changing a focal distance of an imaging lens; zoom magnification changing means for changing a zoom magnification achieved by the zooming means; means for automatically canceling, when the focus range is designated by the focus range designating means, the designation of the focus range; zooming means for changing a focal distance of an imaging lens; zoom magnification changing means for changing a zoom magnification achieved by the zooming means; means for changing the focus range in accordance with the zoom magnification set by the zoom magnification changing means; expanded distance re-measurement selecting means for selecting whether to perform a distance measurement again by expanding a distance measurement range when a focusing operation is performed in a state where the limited range is designated by the focus range designating means; and means for performing the focusing operation again with a range larger than the focus range set by the focus range designating means when no focus is acquired with the limited range set by the focus range designating means and the expanded distance measurement with the expanded distance is permitted by the expanded distance re-measurement selecting means.

A description will now be given of an operation of the above-mentioned digital still camera. The digital still camera is started in a recording mode by operating the mode dial 202 shown in FIG. 2 provided in the operation part 20 shown in FIG. 1 to set the operation mode to the recording mode. When the mode dial 202 is set, the CPU 15 detects that the state of the mode switch contained in the operation part 20 of FIG. 1 is turned on to the recording mode and the CPU 15 controls the driver 19 to move the imaging lens system 1 of the mirror body unit 107 to a position at which photographing can be carried out. Additionally, the CPU 15 causes a power to be supplied to each of the CCD solid imaging element 3, the signal processing part 31, the LCD display 18, etc., so as to start operations of these parts. When those parts are turned on, an operation of a finder mode is started. In the finder mode, a light incident on the CCD solid imaging element 3 through the imaging lens system 1 is converted into an electric signal, and, in this case, the electric signal is sent to the A/D converter 6 through the CDS circuit 4 and the AGC circuit 5 sequentially as an analog RGB signal, which contains analog R, G and B signals. Each of the signals converted into the digital RGB signals by the A/D converter 6 is converted into YUV signals by the YUV conversion part 12 in the digital signal processing IC 32, and is written in the frame memory 17 by the memory controller 9. The YUV signal is read by the memory controller 9, and it is output as a TV output through the display output control part 10, or sent to the LCD display 18 so as to perform a display of the LCD monitor 18A. Normally, the above-mentioned processing is performed at an interval of 1/30 second, and a display of the finder mode as a so-called electric finder is performed, which is updated every 1/30 second.

Additionally, an AF evaluation value which shows a degree of focus of a screen, an AE (automatic exposure) evaluation value which is a result of detection of brightness of the photographing object, and an AWB evaluation value which is a result of detection of a color of the photographing object are calculated from the digital RGB signals retrieved in the CCD interface 8 of the digital signal processing IC 32. These values are read by the CPU 15 as feature data, and are used for each processing of AE, AF and AWB. The AF evaluation value is produced, for example, according to an output integral value of a high-frequency component extraction filter and an integral value of a difference in brightness between adjacent pixels. Since edge portions of the photographing object are sharp when it is in a focused state, a high-frequency component is highest. Using this, at the time of focus detection operation according to AF, the AF evaluation values at various focal lens positions are acquired so as to perform the AF control by determining the maximum position as a focal position. The AE evaluation value and the AWB evaluation value are produced from integral values of R, G, and B signals. For example, the screen is divided into 256 areas so as to calculate each of the RGB integral values. The CPU 15 reads the RGB integral values, and, in AE, calculates brightness of each area so as to determine an AE control value from a brightness distribution. In AWB, an AWB control value matching a color of the light source is determined based on the RGB distribution. The processes of AE and AWB are continuously performed during the finder mode.

When the shutter release (button) 201 is operated, an AF operation which is a detection of a focal position and a still picture recording process are performed. When the shutter release is pressed, a still picture start signal is retrieved from the operation part 20 into the CPU 15, and the CPU 15 performs the mountain-climbing AF by driving the imaging lens system 1 through the motor driver 19 in synchronization with a frame rate. If the focus range is all the areas from infinity to extremely close point, the focal lens moves to a focal position from the extreme close position to infinity or from infinity to extremely close position, and the CPU 15 reads the AF evaluation values of frames produced by the digital signal processing IC 32. The focal lens is moved to a focal position by determining a position at which the AF evaluation value is maximum is the focal position. The analog RGB signals retrieved from the CCD solid imaging element 3 after completion of AF is converted into digital RGB signals, and are stored in the frame memory 17 through the digital signal processing IC 32. The digital RGB signals are again read by the digital signal processing IC 32, and are converted into YUV data, and is returned to the frame memory 17.

At the time of a still picture imaging, the YUV converted image data is sent to a compression processing part 11 comprising an image compression-decompression circuit in the digital signal processing IC 32. The YUV data sent to the compression processing part 11 is compressed, and is returned to the frame memory 17. The compressed data in the frame memory 17 is read through the digital signal processing IC 32, and is stored in the data storage memory of the memory card 22.

A description will now be given of an operation of the digital still camera according to the present embodiment.

TABLE 1

| | Focus Range | |
|---|---|---|
| | Normal (∞–30 cm) | Macro (30–1 cm) |
| Wide angle end Number of focal Positions | 10 positions | 120 positions |
| Telephoto end Number of focal Positions | 70 positions | 250 positions |

Figure 5:
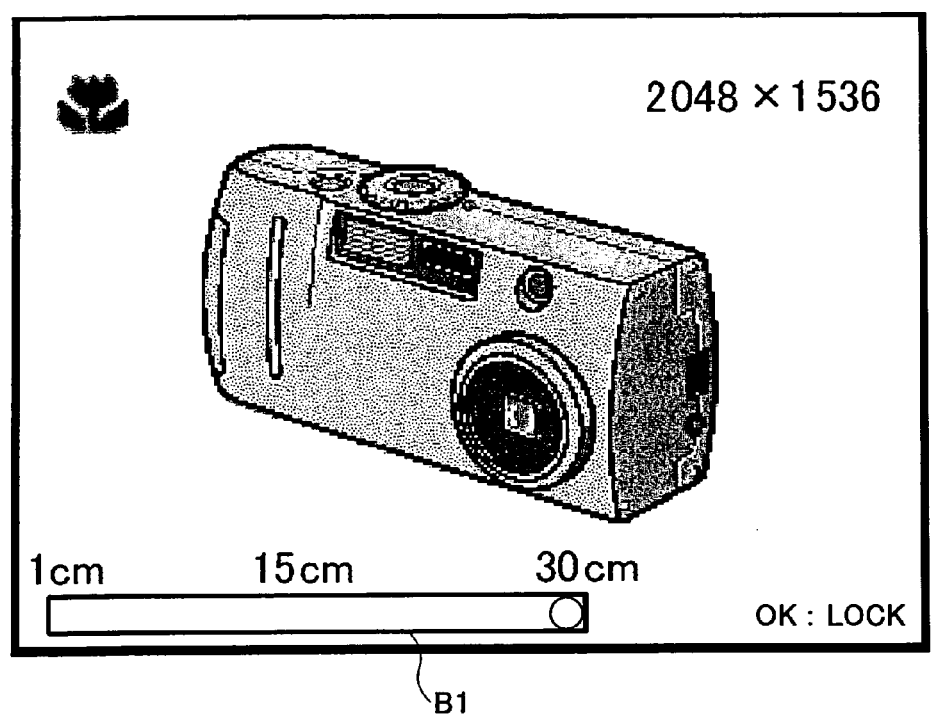
FIG. 5 is an illustration of a display screen of an LCD monitor when a macro mode is set.

Table 1 shows an example of a number of detection positions of the focal position with respect to a zoom position when an extremely close range of 1 cm-30 cm is set to a macro mode and a range distant from the extremely close range is set to a normal mode. In the macro range, if an entire range is scanned, a number of points is extremely large. For example, if there are 120 points, and if a screen updating interval of the finder mode is shifted by 1 point for each frame in 1/30 second, the AF scan takes 4 seconds. Therefore, a condition of the photographing object may change during the AF scan. As measures for solving the above-mentioned problem, a focal time is reduced by limiting the focus range (scanning area). When the down/macro switch 210 shown in FIG. 4 is pressed in the finder mode state, the macro mode is set. FIG. 5 shows an example of a display screen of the LCD monitor 18A when the macro mode is set. A number of record pixels is set to, for example, 2048×1536. A horizontal bar B1 located in a lower portion of the screen indicates a current focal position. Immediately after the macro mode is set, the focal distance is set to 30 cm.

Figure 6:
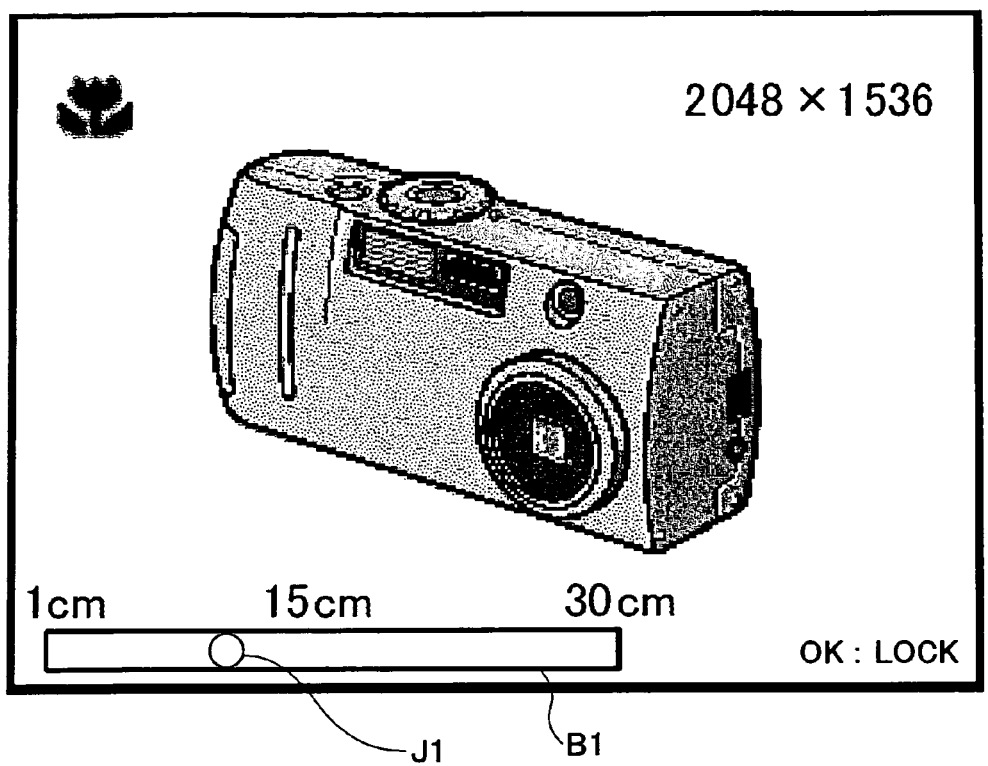
FIG. 6 is an illustration of a display screen after at least one shoot was made or when a shutter release button is half-pressed.

The shutter release 201 shown in FIG. 2 is a two-stage switch so that a focusing operation is performed at a half-pressed position and a recording operation (photographing) is performed when the switch is further pressed. FIG. 6 is the display screen after at least one picture was taken or when the shutter release 201 is half-pressed. In the case shown in FIG. 6, a focus is made about 10 cm, and thus, a mark "○" indicating the focal position J1 of the focal lens is moved to a position corresponding to about 10 cm.

Figure 7:
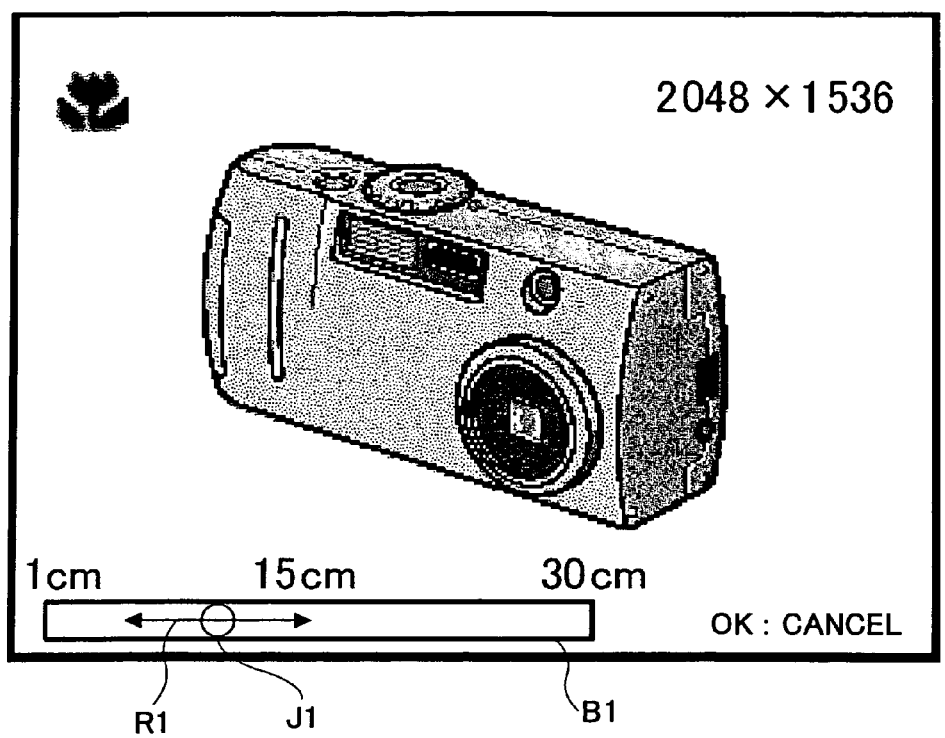
FIG. 7 is an illustration of a display screen after an OK switch is pressed.

There are some methods which realize the detection of a current focal lens position. For example, in a case of driving a focal lens by a stepping motor, a detection of a reference point is performed as a resetting operation at a start time of a camera. A current position can be detected based on a number of pulses supplied to move the stepping motor after the resetting operation. Additionally, a resistance plate may be used to perform a position detection by an output of the resistance plate, which indicates a different resistance according to a position of the focal lens. When the OK switch 212 is pressed in a state shown in FIG. 6, a range near the current focal position is set to an AF scan range for a next time. FIG. 7 shows a display screen after the OK switch 212 is pressed. A range indicated by a leftward and rightward arrow R1 is set to the AF scan range for a next time.

Figure 8:
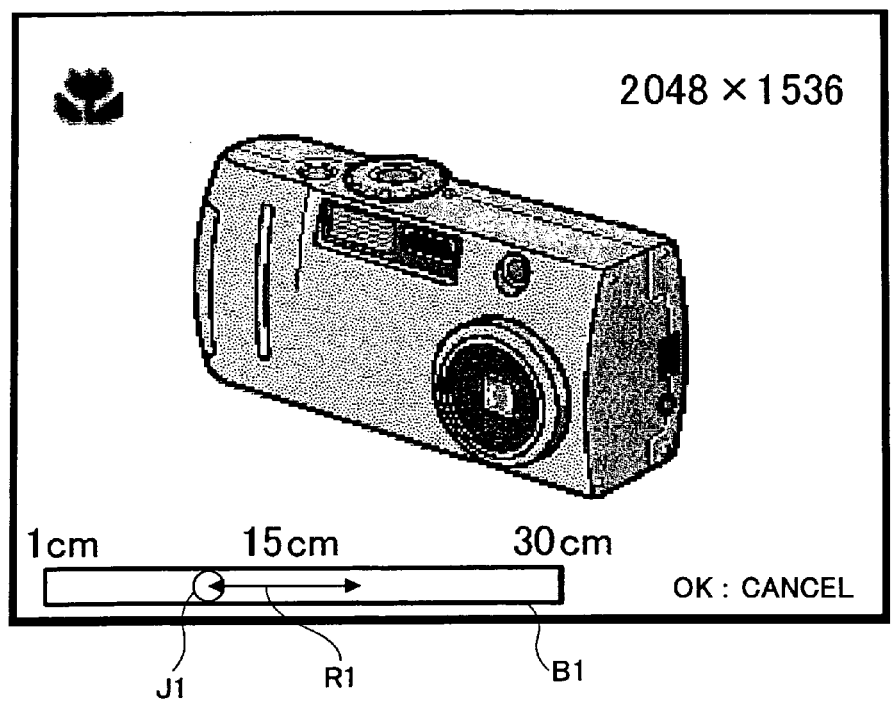
FIG. 8 is an illustration of a display screen showing a change result after changing a setting range.

FIG. 8 is a screen display showing a change result after setting range is changed. Therefore, the change of the setting range is made by the left-and-right button 211 shown in FIG. 4, i.e., the left/image check switch 211 and the right switch 208. In a state where an AF scan range is set as shown in FIG. 7 or FIG. 8, the arrow R1 indicating the AF scan range on the screen is moved by pressing the left-and-right button 211. The range indicated by the arrow R1 is set to the scan range at a next AF. In this state if the shutter release 201 is fully pressed to perform a photographing operation, an AF operation is performed prior to recording. If the scan range is limited to, for example, 15 steps, the time required for AF can be set to 0.5 second since the screen update is every $\frac{1}{30}$ second, which greatly reduces a shutter time lag. Additionally, a period to operate the focus motor and a distance (an amount of rotation) can be reduced, which reduces power consumption.

Figure 9:
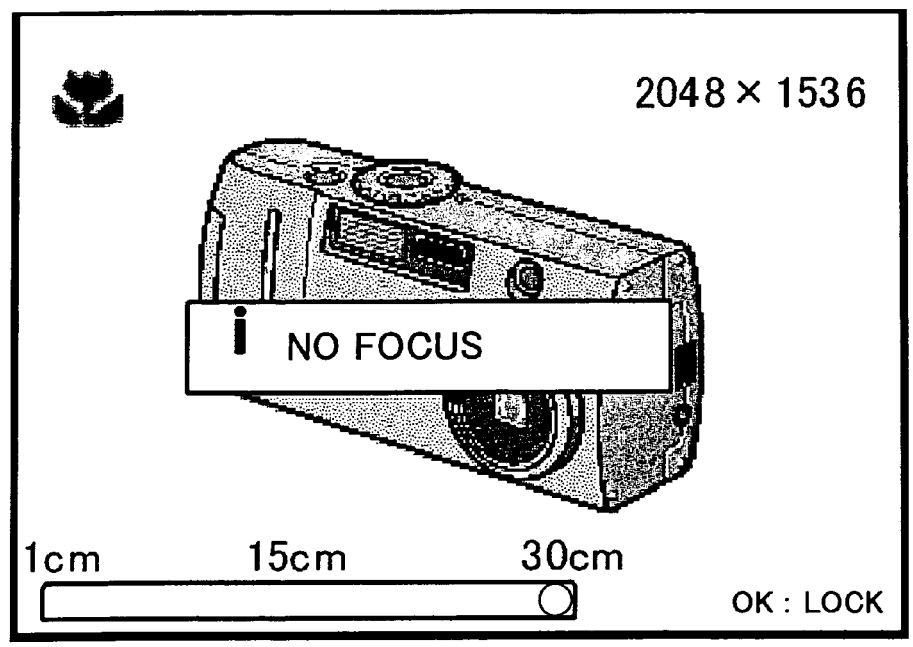
FIG. 9 is an illustration of a display screen giving an alarm in a macro mode.
Figure 10:
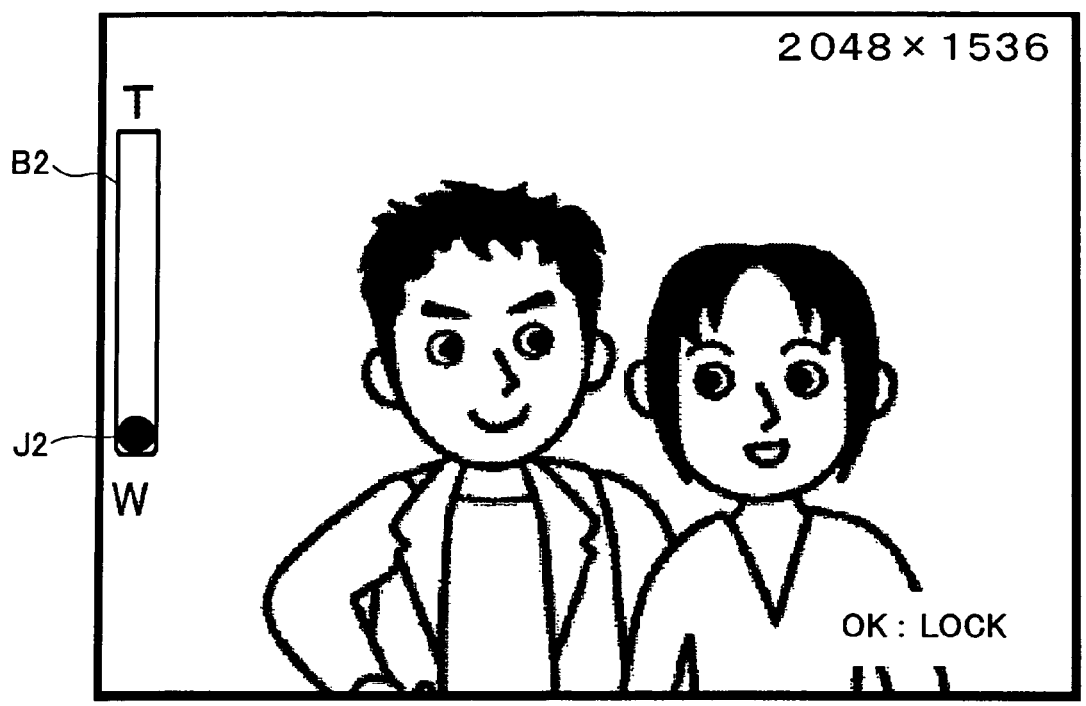
FIG. 10 is an illustration of a display screen when a finder mode is started after a power switch is turned on in a recording mode.

If the OK switch 212 is pressed in the state shown in FIG. 7 or FIG. 8, the AF scan range is cancelled, and the display returns to the screen shown in FIG. 6. In the macro mode state, if the down/macro switch 210 is pressed again, it returns to the normal photographing mode such as shown in FIG. 10. Even if the scan range has been set as shown in FIG. 7 or FIG. 8, the range setting is cancelled together with the macro mode being turned off. Additionally, if the OK switch 212 is pressed in the state shown in FIG. 5, which is an initial state after being set to the macro mode, an alarming screen is displayed such as shown in FIG. 9. This is because a focusing operation has not been performed after the macro mode was set and to prevent the scan range from being limited in a state where a distance is not known.

A description will now be given of a case where the AF scan range is limited in the normal photograph mode. If the AF scan is performed on the entire range, a time period required for the focusing varies depending on a zoom position since a number of steps is greatly different between the wide angle end (WIDE end) and the telephoto end (TELE end) of the zoom. Therefore, when taking a picture of a moving object, a consideration must be given that a shutter release time lag varies according to a zoom position. If the distance is known approximately, the AF time can be reduced by limiting the scan range to a certain range. For example, if an amount of movement of the focal lens is maintained constant, the shutter release time lag can be set constant irrespective of the zoom position.

Figure 11:
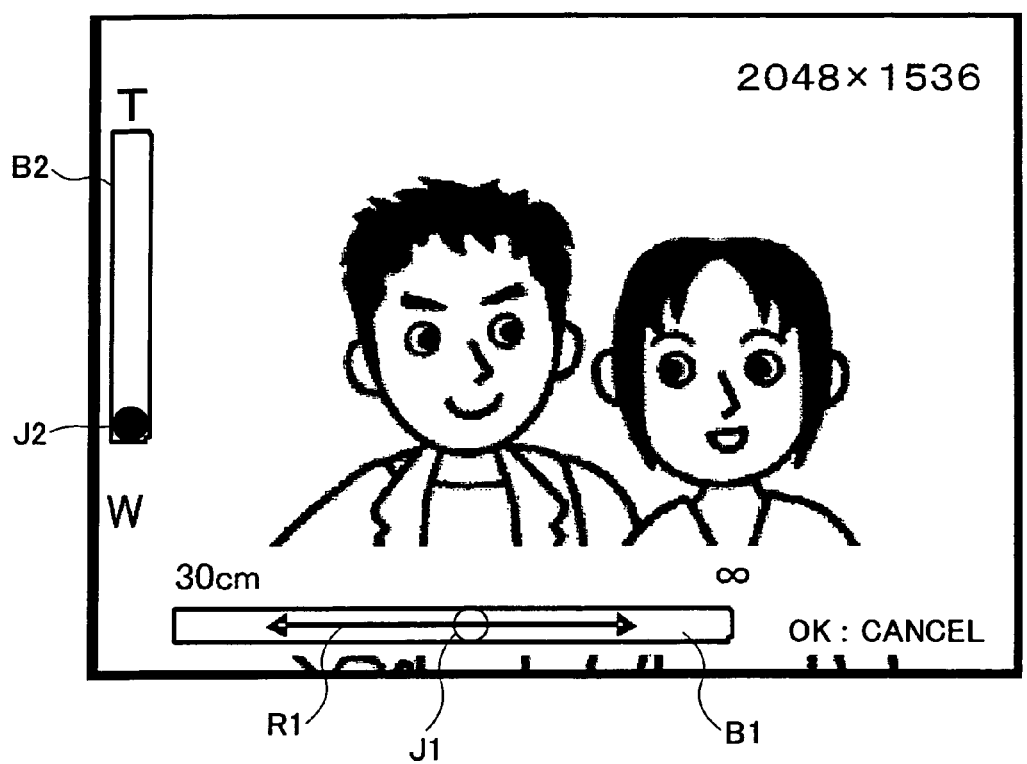
FIG. 11 is an illustration of a display screen when a focus range is designated on a wide angle side in a normal mode.
Figure 12:
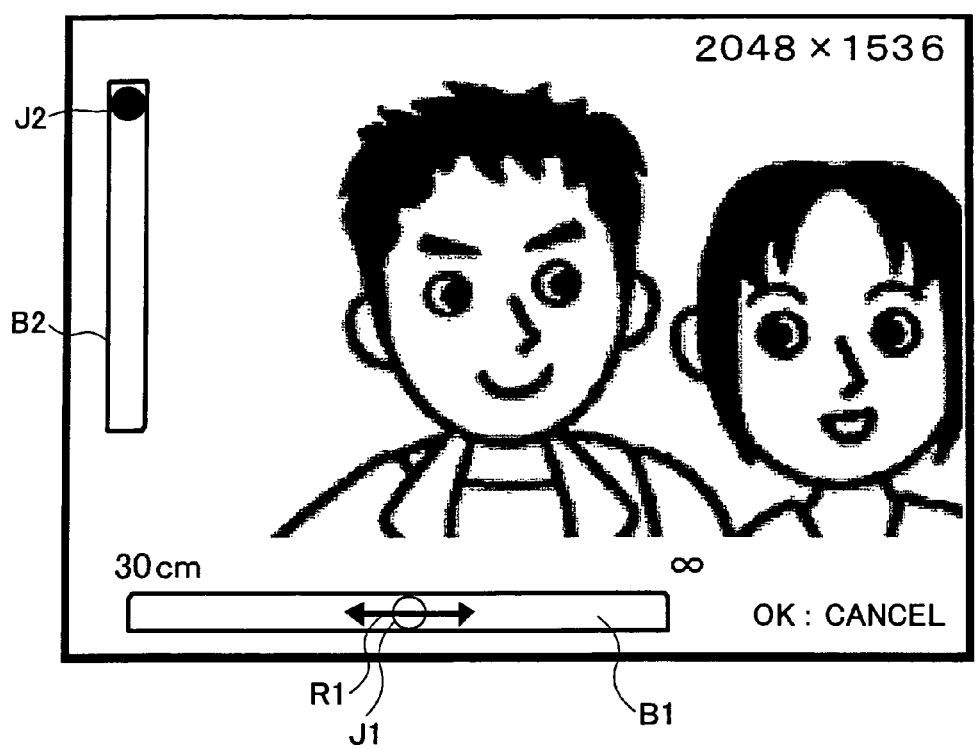
FIG. 12 is an illustration of a display screen when a focus range is designated on a telephoto side in the normal mode.

FIG. 10 shows a display when the finder mode is started after the power switch 101 is turned on in the recording mode. The zoom position at the time of start is set to the wide angle end. The display of a bar B-2 on the left side is a bar indication which indicates the zoom position, and it can be appreciated that it is operated at the wide angle end. If the OK switch 212 is pressed in the state of the display shown in FIG. 10, the screen is changed to a display shown in FIG. 11. The horizontal bar B1 in a lower part of the screen indicates information regarding focus. A mark "○" indicates a current position J1 of the focal lens, and an arrow R1 indicate a scan range at a next AF. At the wide angle end as shown in FIG. 11, since focus detection positions are only 10 points, 7 points are set to be the detection range. Since high-pass filter outputs of 7 frames are acquired with the detection range of 7 points, a time period required for the AF scan is about 0.25 seconds. Additionally, FIG. 12 shows a case where the zoom is changed to the telephoto end. When a zoom magnification change is set by the zoom switches 203 and 204, the CPU 15 drives the motor driver 19 to move the zoom lens. The zoom lens moves in a requested direction while the zoom switch 203 or 204 is pressed, and a mark "●" indicating a zoom position J2 along a zoom bar B2 moves in response to the moved position of the zoom lens as shown in FIG. 12.

Although AF scan points are needed to be 7 points so as to prevent the AF scan time from being changed largely depending on a zoom position, 10 points are used in the present embodiment since the number of points is too small, if only 7 points are used, as compared to 70 points of the entire range of the telephoto end. When the entire area is canned, the scan time is 70×$\frac{1}{30}$=2.3 seconds. On the other hand, if they are limited to 10 points, scan time can be reduced to 0.33 seconds. By doing such, it becomes possible to reduce the AF focus detection operation time, and the system having less difference in a time lag due to differences in zoom position can be achieved. Moreover, since an amount of operation of mechanical parts can be reduced, it can be achieved to reduce power consumption. Furthermore, since the focus range is clearly displayed on the screen, a photographer can check whether an intended range is set to the focus range. Since it can be checked beforehand to focus within the displayed range, if a picture is taken across a wire netting, it is free from care that a focus is made to the wire netting in front, which realizes the AF having little failure. Additionally, if the OK switch 212 is pressed in the state shown in FIG. 11 or FIG. 12, the setting of the focus range is cancelled, and it returns to the state as shown in FIG. 10.

In each example mentioned above, the number of AF focal points is determined so that the scan time periods are almost equal. However, there is a determining method in which a focal distance is within a range of a uniform ratio. For example, if a range is specified to cover 50% of the entire area, 5 points are set to the focal points on the zoom wide angle end, and 35 points are set on the zoom telephoto end. In the above-mentioned embodiment, the method of changing a distance range to the photographing object in order to equalize the focus time by equalizing the ranges of movement of the focal lens, and the method of changing the movable range of the focal lens by maintaining a distance range to a photographing object. However, depending on the zoom magnification, the difference in the number of points between the wide angle end and the telephoto end is larger. Therefore, if the zoom magnification is changed in the state where the focus range is designated, as shown in FIG. 11 or FIG. 12, the designation of the focus range may be automatically cancelled.

Additionally, it may be so constructed to set whether to detect a focal position by expanding the range even if it takes a long time so as to scan, for example, an entire range or limit the range to a set range, when focus cannot be acquired as a result of AF performed on a limited narrow scan range. If the range is set to be expandable, it can be automatically responded to a change in the photographing object even though the focusing time is increased, which reduces possibility of failure in taking a picture. However, when it is known beforehand that the focal point exists within a set range, it is needless to scan by expanding the range and an unnecessary power may be consumed. Additionally, if a focus is acquired at a point outside the limited range by scanning an entire range, the intended picture cannot be taken. Therefore, it is preferable that a selection can be made whether or not to expand the range when there is no focal point found in the range.

Namely, providing means for selecting whether or not to perform a distance measurement again by expanding the distance measurement range when a focal point cannot be found as a result of focusing operation in a state where a narrow range is set, so as to perform a focusing operation on a range larger than the set range if a focal point cannot be acquired in the set narrow range and if an expanded distance re-measurement is permitted. It should be noted that the imaging apparatus according to the present invention can be achieved as a general purpose apparatus using a computer system, instead of constituting as an exclusive digital still camera. For example, an apparatus performing the above-mentioned process may be constructed by installing a program for causing a computer to perform the above-mentioned operation by reading the program from a recording medium such as a flexible disk, a CD-ROM, etc. According to the installation, the program is stored in a medium such as a hard disk or the like in the computer system, which constitutes the above-mentioned apparatus and used in practice. Moreover, the program concerned may be distributed to FTP (File Transfer Protocol) clients through a network by registering the program in an FTP server provided on the network such as the Internet. The program may be registered in an electronic bulletin board system (BBS) of a communication network so as to distribute the program through the network. Thus, the above-mentioned process can be achieved by executing the program under a control of an operating system (OS). Furthermore, above-mentioned process can be achieved by executing the program while the program is being transferred through a communication network.

Second Embodiment

A description will now be given of a digital still camera as an imaging apparatus according to a second embodiment according to the present invention.

Figure 13:
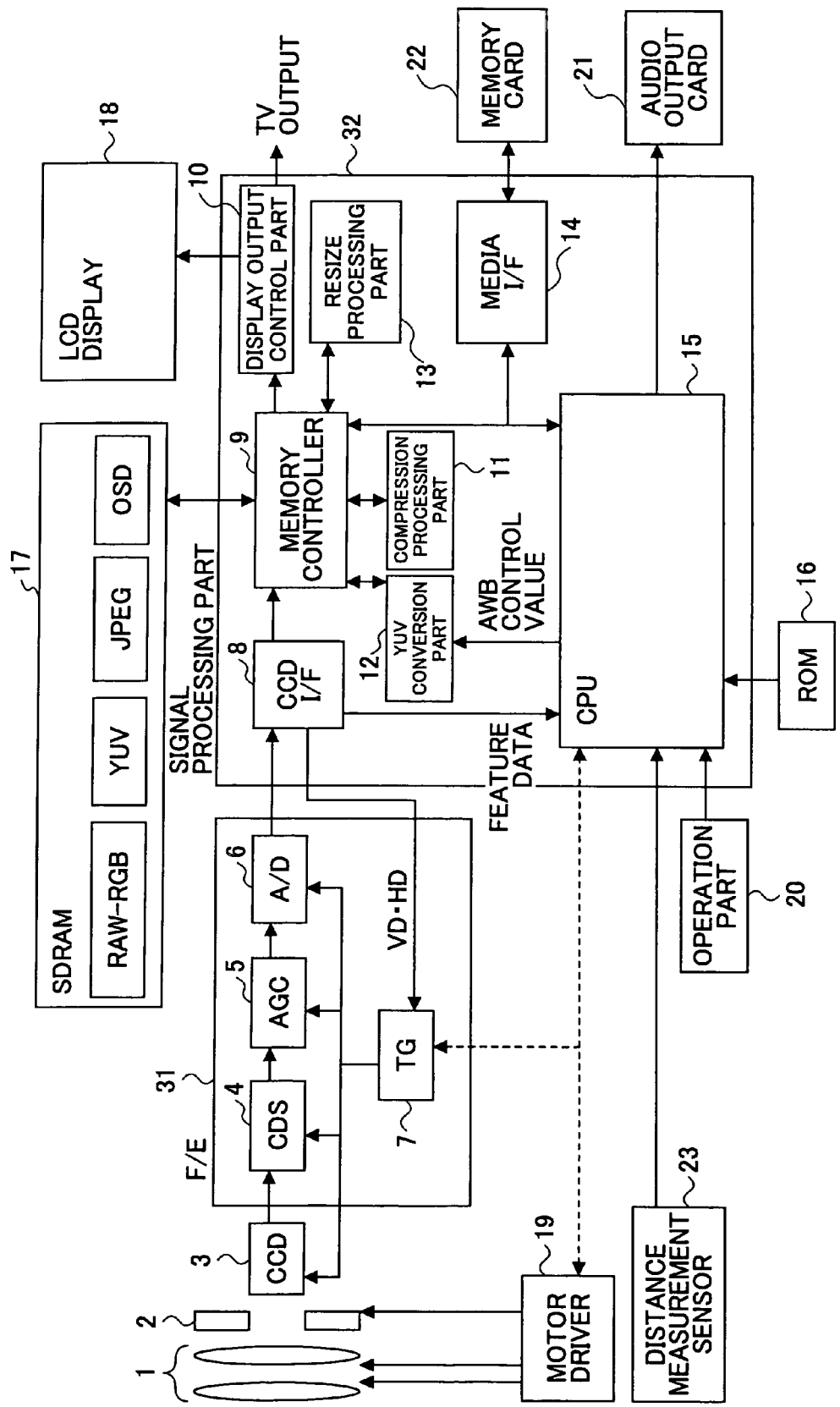
FIG. 13 is a block diagram of an outline of an entire system of a digital still camera according to a second embodiment of the present invention.

FIG. 13 is a block diagram of an outline of an entire system of the digital still camera according to the second embodiment of the present invention. The digital still camera according to the second embodiment of the present invention has the same structure as the digital stile camera according to the first embodiment shown in FIG. 1 except for a distance measurement sensor 23 being connected to the CPU 15. In FIG. 13, parts that are the same as the parts shown in FIG. 1 are given the same reference numerals, and descriptions there of will be omitted for the sake of simplification of the description.

As shown in FIG. 13, the distance measurement sensor 23 is connected to the CPU 15. The distance measurement sensor 23 together with the distance measurement unit 105 shown in FIG. 3 constitute distance measurement means for periodically measuring a distance to a photographing object according to a so-called triangular surveying method. The CPU 15 monitors changes in a measured value of a distance to a photographing object by the distance measurement sensor 23 so as to determine whether or not a focused state is maintained.

Parts provided on the digital still camera according to the present embodiment are the same as the parts shown in FIGS. 2 through 4, and, thus, the same reference numerals are given and the descriptions thereof will be omitted.

It should be noted that the parts shown in FIG. 13, mainly circuit parts, realize the following means under a control of the CPU 15: focus control means for sequentially detecting a focal point while moving a focal lens and stopping the focal lens at the focal point so as to perform an automatic focusing operation; range control means for causing the focus control means to perform the automatic focusing operation by limiting a movable range of the focal lens to a range narrower than an entire focus range with an immediately preceding focal point when taking a picture in the macro mode and a predetermined condition is satisfied; focus control means for sequentially acquiring from an image signal an automatic focus evaluation value, which is acquired in correspondence with sharpness of an edge portion of a photographing object image, and stopping the focal lens at a focal point being set to a maximum point of the automatic focus evaluation value so as to perform an automatic focusing operation; range control means for causing the focus control means to perform the automatic focusing operation by limiting a movable range of the focal lens to a range narrower than an entire focus range with an immediately preceding focal point when taking a picture in the macro mode and a predetermined condition is satisfied; means for causing the focusing operation to be performed on the limited range when the predetermined condition is satisfied; means for monitoring a focus state in the focus control means; means for causing the focusing operation on the limited range when the predetermined condition is satisfied, the predetermined condition including that a focus state after an immediately preceding focusing operation is maintained base on the means for monitoring; means for monitoring a change in the distance measured by the distance measurement means; means for causing the focusing operation on the limited range when the predetermined condition is satisfied, the predetermined condition including that the change in the distance after an immediately preceding automatic focusing operation is equal to or less than a predetermined value base on the monitoring by the means for monitoring; brightness distribution measuring means for measuring a brightness distribution in a picture screen; means for monitoring a change in the brightness distribution measured by the brightness distribution measuring means; means for causing the focusing operation on the limited range when the predetermined condition is satisfied, the predetermined condition including that the change in the brightness distribution after an immediately preceding automatic focusing operation is equal to or less than a predetermined amount base on the monitoring by the means for monitoring; means for monitoring a change in the zoom magnification in the imaging optical system; and means for causing the focusing operation to be performed on an entire focus range when the zoom magnification has changed based on the monitoring of the means for monitoring; means for monitoring the automatic focus value in the focus control means; and means for causing the focusing operation on the limited range when the predetermined condition is satisfied, the predetermined condition including that the change in the automatic focus evaluation value after an immediately preceding automatic focusing operation is equal to or less than a predetermined value base on the monitoring by the means for monitoring.

A description will now be given of an operation of the above-mentioned digital still camera. The digital still camera is started in a recording mode by operating the mode dial 202 shown in FIG. 2 provided in the operation part 20 shown in FIG. 1 to set the operation mode to the recording mode. When the mode dial 202 is set, the CPU 15 detects that the state of the mode switch contained in the operation part 20 of FIG. 1 is turned on to the recording mode and the CPU 15 controls the driver 19 to move the imaging lens system 1 of the mirror body unit 107 to a position at which photographing can be carried out. Additionally, the CPU 15 causes a power to be supplied to each of the CCD solid imaging element 3, the signal processing part 31, the LCD display 18, etc., so as to start operations of these parts. When those parts are turned on, an operation of a finder mode is started. In the finder mode, a light incident on the CCD solid imaging element 3 through the imaging lens system 1 is converted into an electric signal, and, in this case, the electric signal is sent to the A/D converter 6 through the CDS circuit 4 and the AGC circuit 5 sequentially as an analog RGB signal, which contains analog R, G and B signals. Each of the signals converted into the digital RGB signals by the A/D converter 6 is converted into YUV signals by the YUV conversion part 12 in the digital signal processing IC 32, and is written in the frame memory 17 by the memory controller 9. The YUV signal is read by the memory controller 9, and it is output as a TV output through the display output control part 10, or sent to the LCD display 18 so as to perform a display of the LCD monitor 18A. Normally, the above-mentioned processing is performed at an interval of 1/30 seconds, and a display of the finder mode as a so-called electric finder is performed, which is updated every 1/30 second.

Additionally, an AF evaluation value which shows a degree of focus of a screen, an AE (automatic exposure) evaluation value which is a result of detection of brightness of the photographing object, and an AWB evaluation value which is a result of detection of a color of the photographing object are calculated from the digital RGB signals retrieved in the CCD interface 8 of the digital signal processing IC 32. These values are read by the CPU 15 as feature data, and are used for each processing of AE, AF and AWB. The AF evaluation value is produced, for example, according to an output integral value of a high-frequency component extraction filter and an integral value of a difference in brightness between adjacent pixels. Since edge portions of the photographing object are sharp when it is in a focused state, a high-frequency component is highest. Using this, at the time of focus detection operation according to AF, the AF evaluation values at various focal lens positions are acquired so as to perform the AF control by determining the maximum position as a focal position. The AE evaluation value and the AWB evaluation value are produced from integral values of R, G, and B signals. For example, the screen is divided into 256 areas so as to calculate each of the RGB integral values. The CPU 15 reads the RGB integral values, and, in AE, calculates brightness of each area so as to determine an AE control value from a brightness distribution. In AWB, an AWB control value matching a color of the light source is determined based on the RGB distribution. The processes of AE and AWB are continuously performed during the finder mode.

When the shutter release (button) 201 is operated, an AF operation which is a detection of a focal position and a still picture recording process are performed. When the shutter release is pressed, a still picture start signal is retrieved from the operation part 20 into the CPU 15, and the CPU 15 performs the mountain-climbing AF by driving the imaging lens system 1 through the motor driver 19 in synchronization with a frame rate. If the focus range is all the areas from infinity to extremely close point, the focus lens moves to a focal position from the extreme close to infinity or from infinity to extremely close, and the CPU 15 reads the AF evaluation values of frames produced by the digital signal processing IC 32. The focal lens is moved to a focal position by determining a position at which the AF evaluation value is maximum is the focal position. The analog RGB signals retrieved from the CCD solid imaging element 3 after completion of AF is converted into digital RGB signals, and are stored in the frame memory 17 through the digital signal processing IC 32. The digital RGB signals are again read by the digital signal processing IC 32, and are converted into YUV data, and is returned to the frame memory 17.

At the time of a still picture imaging, the YUV converted image data is sent to a compression processing part 11 comprising an image compression-decompression circuit in the digital signal processing IC 32. The YUV data sent to the compression processing part 11 is compressed, and is returned to the frame memory 17. The compressed data in the frame memory 17 is read through the digital signal processing IC 32, and is stored in the data storage memory of the memory card 22.

A description will now be given of an operation of the digital still camera according to the present embodiment.

The previously mentioned Table 1 shows an example of a number of detection positions of the focal position with respect to a zoom position when an extremely close range of 1 cm-30 cm is set to a macro mode and a range distant from the extremely close range is set to a normal mode.

According to the Table 1, when comparing the numbers of positions of the focal lens at which the AF evaluation values are acquired between the normal mode and the macro mode, 10 positions are set for the normal mode while 120 positions are set for the macro mode at the wide angle end, and 70 positions are set for the normal mode while 250 positions are set for the macro mode. Thus, the number of positions of the focal lens at which the AF evaluation values are acquired when scanning an entire macro area is extremely larger than that of the normal area.

The reason for the number of positions of the focal lens at which the AF evaluation values are acquired being larger than that of the normal are can be explained according to a Newton's formula (1) which represent a relationship between the principal point of the lens and image formation.

$$\text{Newton's formula: } Z \times Z' = -f \times f \tag{1}$$

Z: a distance (photographing object distance) from a principal point to a photographing object surface Z": a distance (imaging surface distance) from a principal point to an imaging surface f: focal distance In order to acquire a ratio of changes in the imaging surface distance and the photographing object distance when the distance between the principal point and the picturing distance is changed, the Newton's formula (1) is differentiated according to the distance Z from the principal point to the photographing object to acquire formula (2).

Differentiate the Newton's formula according to the distance Z from the principal point to the photographing object:

$$dZ/dZ'=f \times f/Z \times Z \quad (2)$$

In the macro area, Z is small since the distance from the principal point to the photographing object is small, and according to the formula (2) when a value of Z×Z, which is a denominator, becomes small, a change in the imaging surface distance becomes large relative to the photographing object distance. That is, since the imaging surface distance changes greatly even if the photographing object distance changes small, the focal lens must be moved large so as to make a focus. Moreover, if the focal distance of the lens changes even when the picturing distance is the same, according to the formula (2), a value of f×f, which is a numerator, becomes large, a change in the imaging surface distance becomes large relative to the photographing object distance. Therefore, since the imaging surface distance changes greatly as the focal distance increases even when the photographing object distance changes little, the focal lens must be moved greatly so as to make a focus.

Figure 14:
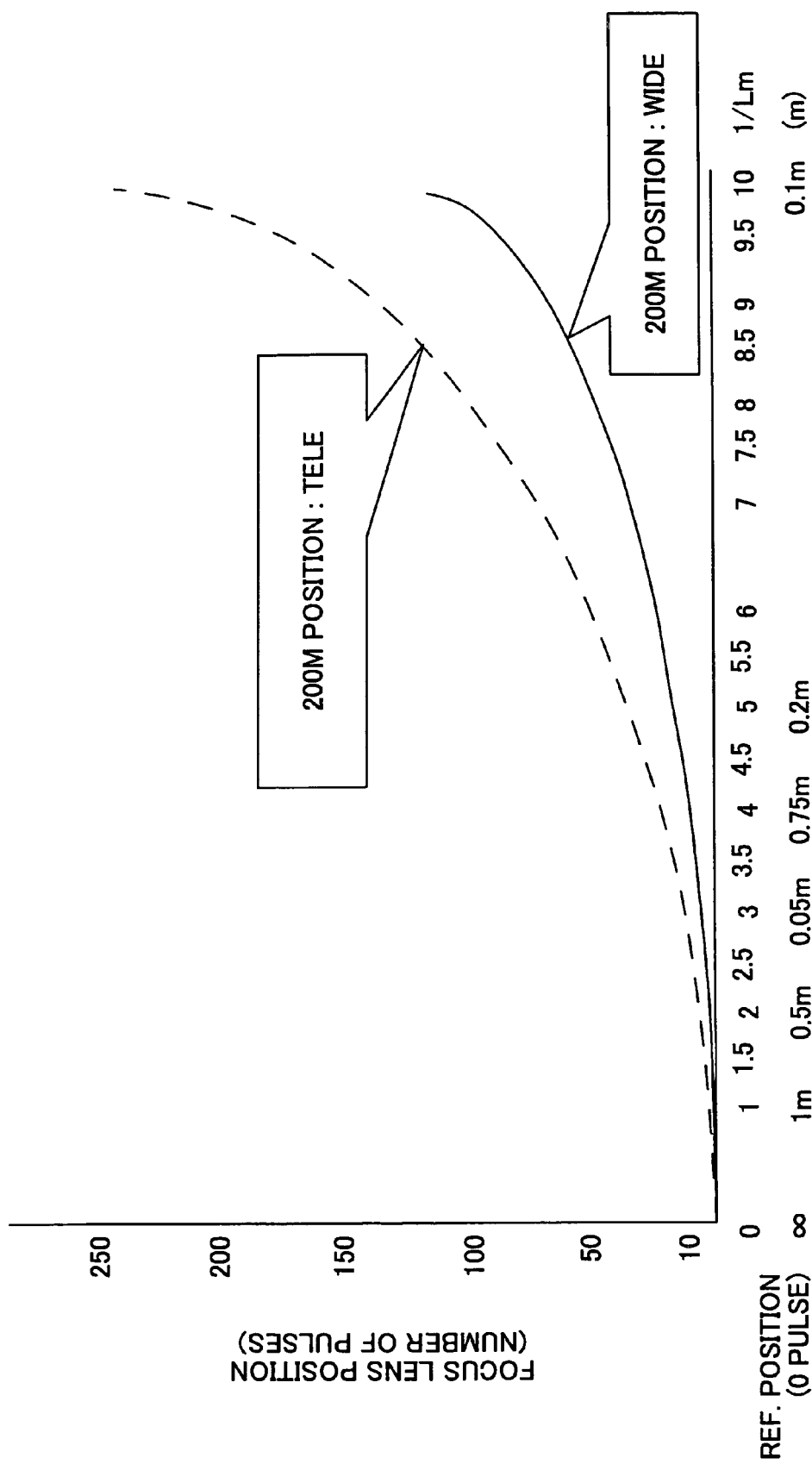
FIG. 14 is a graph showing a relationship between an inverse of a focal distance and a number of positions of a focal lens shown in Table 1.

FIG. 14 is a graph showing a relationship between the inverse of focus distance and the number of positions of the focus lens shown in Table 1. The reason for using the inverse of focus distance is because an amount of running out of the focal lens is smallest when focused on infinite. It should be noted that, in FIG. 14, a pulse number of running out of the focal lens when focused on infinite is set to "0". Here, the AF evaluation value is calculated based on the RGB signals as mentioned above, and since the RGB signals are acquired at an updating timing of the screen, if the RGB signals are acquired at a screen updating interval of 1/30 second, a time required for acquiring the AF evaluation values at 120 positions is as long as 120×1/30=4 seconds. Therefore, there is a problem in that a photo opportunity, that is, so-called shutter releasing chance, is missed such that a state of the photographing object is changed. As a measure for solving the above-mentioned problem, the focus time is reduced by limiting a focus range (scan area) under a specific condition, which enables taking a picture without missing a photo opportunity. For example, if an automatic focus scan is performed by limiting the focus range so that the positions of the focal lens at which the AF evaluation values are acquired are 15 positions which are 1/8 of 120 positions, the automatic focus scan is completed in 0.5 seconds, which reduces a time lag. Moreover, by doing so, an operating time of the motor for driving the focal lens is reduced, thereby reducing power consumption.

A description will now be given of an operation of the digital still camera according to the present embodiment.

When the down/macro switch 210 shown in FIG. 4 is pressed in the finder mode state, the macro mode is set. FIG. 5 shows an example of a display screen of the LCD monitor 18A when the macro mode is set. A number of record pixels is set to, for example, 2048×1536. A horizontal bar B1 located in a lower portion of the screen indicates a current focal position. That is, a mark "○" indicates a focus position J1 corresponding to a current position of the focal lens. Immediately after the macro mode is set, the focal distance is set to 30 cm. (However, in this sate, the automatic focusing operation has not been performed yet, the position J1 is dos not accurately match the focal point.)

Figure 15:
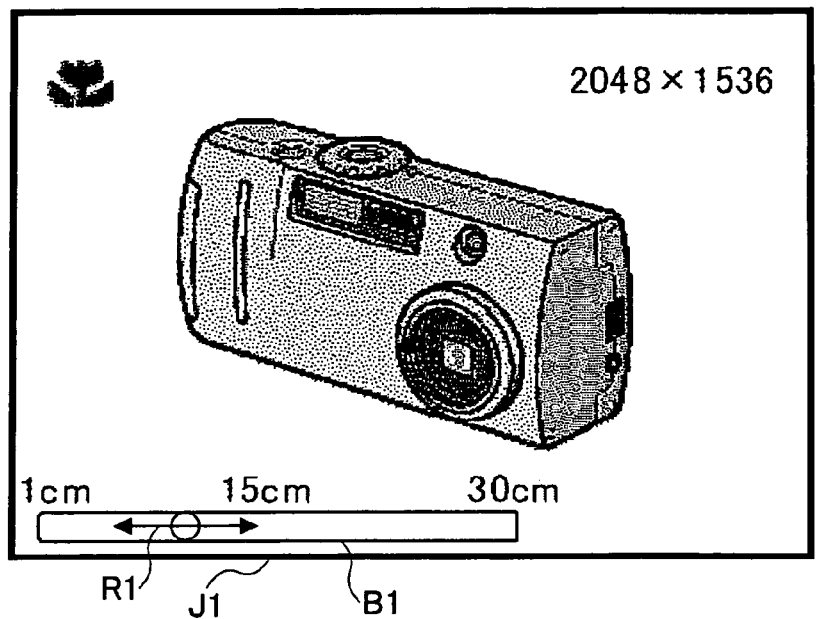
FIG. 15 is a display screen after at least one picture was taken or when a shutter release button is half-pressed.

The shutter release 201 shown in FIG. 2 is a two-stage switch so that a focusing operation is performed at a half-pressed position and a recording operation (photographing) is performed when the switch is further pressed. FIG. 15 is the display screen after at least one shoot was made or when the shutter release 201 is half-pressed. In the case shown in FIG. 15, a focus is made about 10 cm, and thus, the mark "○" indicating the focal position J1 of the focal lens is moved to a position corresponding to about 10 cm. In this case, the leftward and rightward arrows R1 displayed together with "○" indicate that the focused state is maintained. While the focused state is maintained, the arrows R1 are always displayed, and the range indicated by the leftward and rightward arrows R1, which is narrower than the entire focus range indicated by the bar B1, is used as an object of a focusing operation at a next time. That is, the leftward and rightward arrows R1 indicate that the camera is in the focused state and, simultaneously, indicate a limited range of a focusing operation at a next time.

Figure 16:
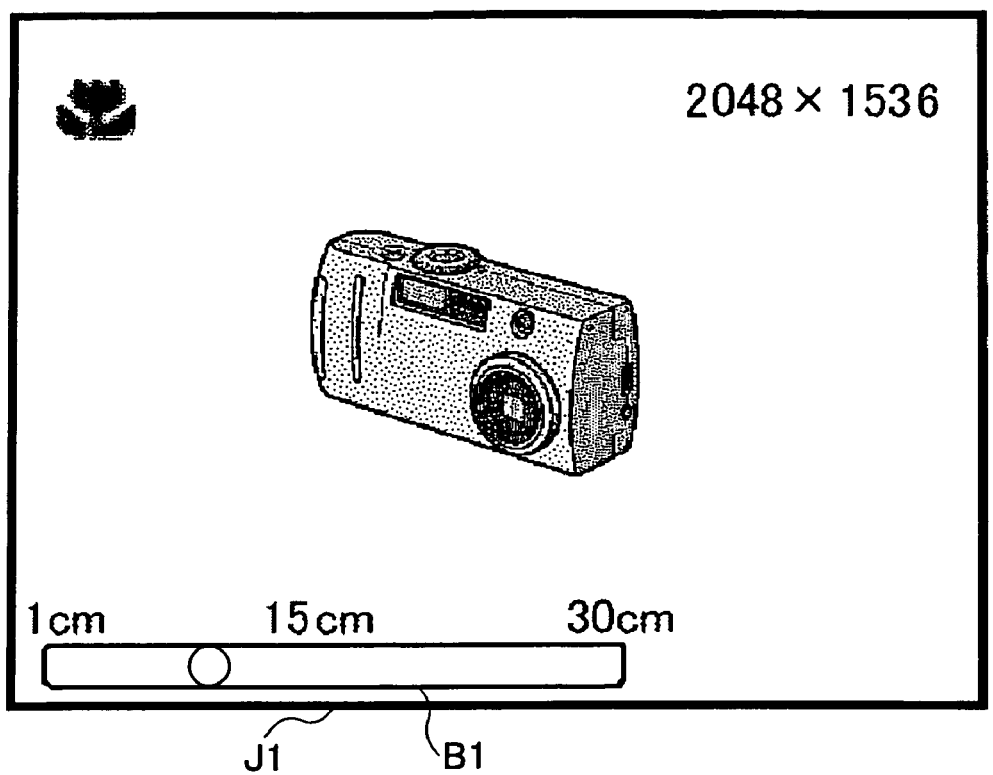
FIG. 16 is a display screen when the camera does not maintain a focused state.

FIG. 16 shows a display screen when the camera does not maintain a focused state. This is realized by continuously monitoring the output of the distance measurement sensor 23 shown in FIG. 13 using the distance measurement unit 105 shown in FIG. 3 after execution of the last automatic focusing. At the time of the last mountain-climbing AF execution, the CPU 15 retains the output of the distance measurement sensor 23 in the RAM provided in the CPU 15. Thereafter, the photographing object distance is measured by the distance measurement sensor 23 periodically, for example, every 0.1 second, and the measured value is compared with photographing object information retained in the RAM each time. If the photographing object distance changed, for example, more than 5 cm, it is no longer regarded that a state of the previous picturing time is maintained, and, thus, it is determined that a focused state is not maintained. These determination reference depends on a zoom position and a position of the focal lens, and is previously stored in the ROM 16 as table information. As shown in this FIG. 16, when the leftward and rightward arrow R1 is not displayed, an overall focus range scan is performed in a subsequent automatic focusing operation.

As shown in FIG. 15 and FIG. 16, in order to indicate the focus point by a distance in centimeters, the distance must be acquired by converting from the position of the focal lens. There are various methods of conversion such as to use an equation based on a relationship between the inverse of focal distance and the number of positions of the focal lens shown in FIG. 14, or to store a relationship between the inverse of focal distance and the number of positions of the focal lens in the ROM 16 as conversion table information. There are some methods which realize the detection of a current focal lens position. For example, in a case of driving a focal lens by a stepping motor, a detection of a reference point is performed as a resetting operation at a start time of a camera. A current position can be detected based on a number of pulses supplied to move the stepping motor after the resetting operation. Additionally, a resistance plate may be used to perform a position detection by an output of the resistance plate, which indicates a different resistance according to a position of the focal lens. As also shown in Table 1, in the case of a zoom lens, even if the same distance range is subjected to the automatic focus scan, a number of moving pulses greatly differ depending on the zoom position. Moreover, many lenses have lower lens resolution as it goes further to the telephoto side. Therefore, when a zoom position is changed, the display is changed to that shown in FIG. 16, and an automatic focus scan is performed over the entire range as regarded that a focused state is not maintained when a subsequent automatic focusing operation is performed. Thus, failure picturing can be eliminated according to the above-mentioned operation.

Figure 17:
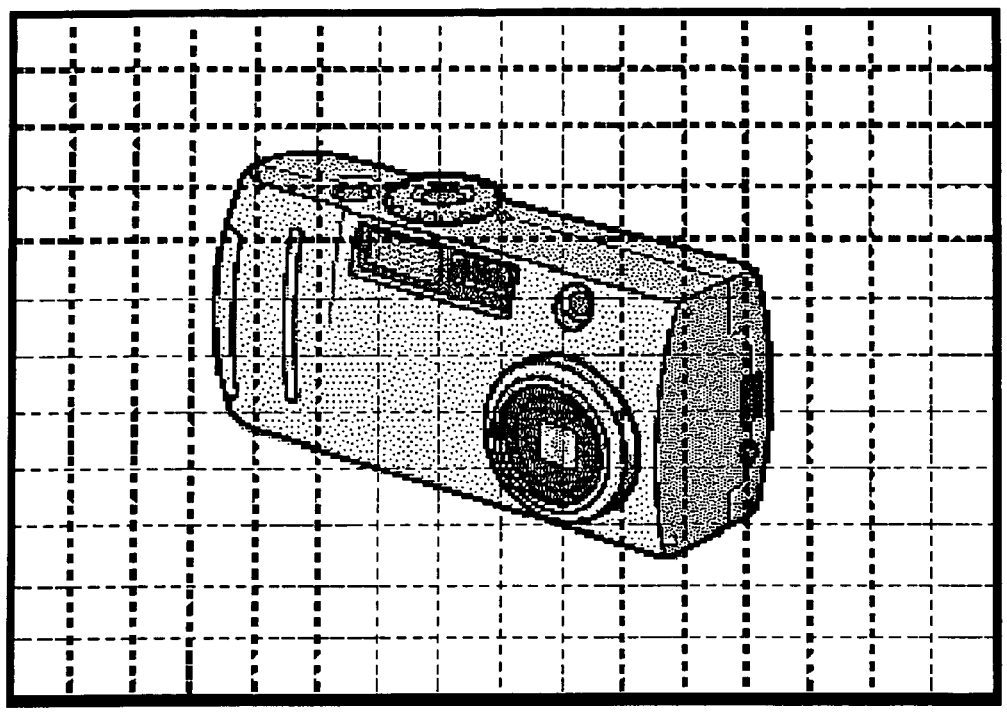
FIG. 17 is an illustration of a screen image immediately after performing an automatic focusing operation.
Figure 18:
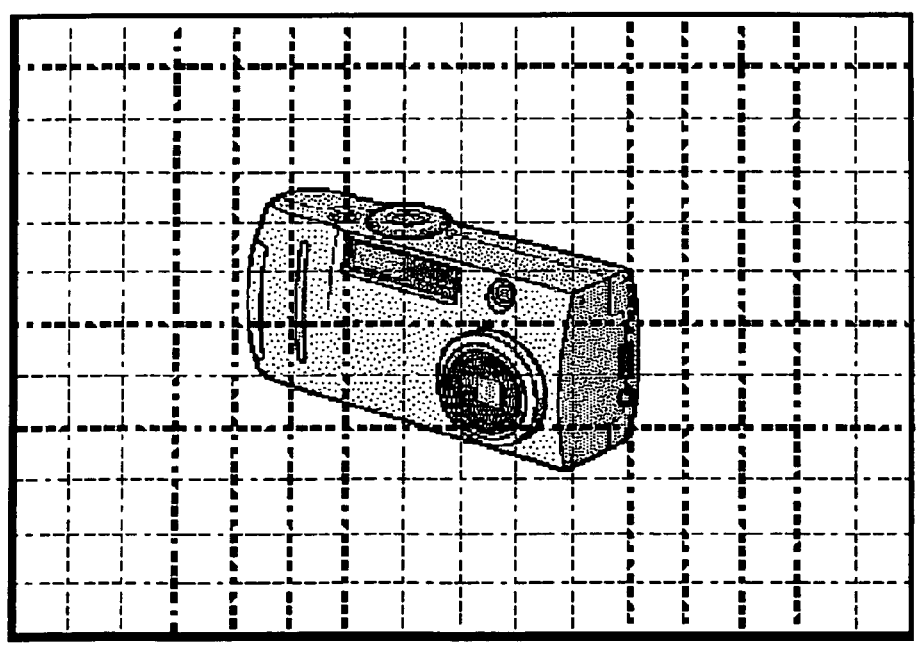
FIG. 18 is an illustration of a screen image in a state where a distance to a photographing object changes after an automatic focusing operation was performed.

FIG. 17 is an illustration of a screen image immediately after performing an automatic focus operation. FIG. 18 is an illustration of a screen image in a state where the distance to a photographing object changes after an automatic focus operation was performed. In the present embodiment, for example, the image data is 8-bit data, which can represent values 0-255. The image data comprises three primary colors R, G and B, and brightness data is calculated by the following equation.

$$\text{Brightness } Y=0.3R+0.6G+0.1B \quad (3)$$

In this case, since the image data is 8-bit data, the brightness data is also 8-bit data. In the present embodiment, as shown in FIG. 17 and FIG. 18, the screen is divided into blocks of vertical 12×horizontal 16 so as to acquire the brightness data for each divided block. Acquisition of the brightness data can be achieved by calculating average values of R, G, B for each block in the CCD interface 8 shown in FIG. 13, reading the calculated average valued by the CPU 15, and converting the average values into the brightness data according to the equation (3).

Figure 21:
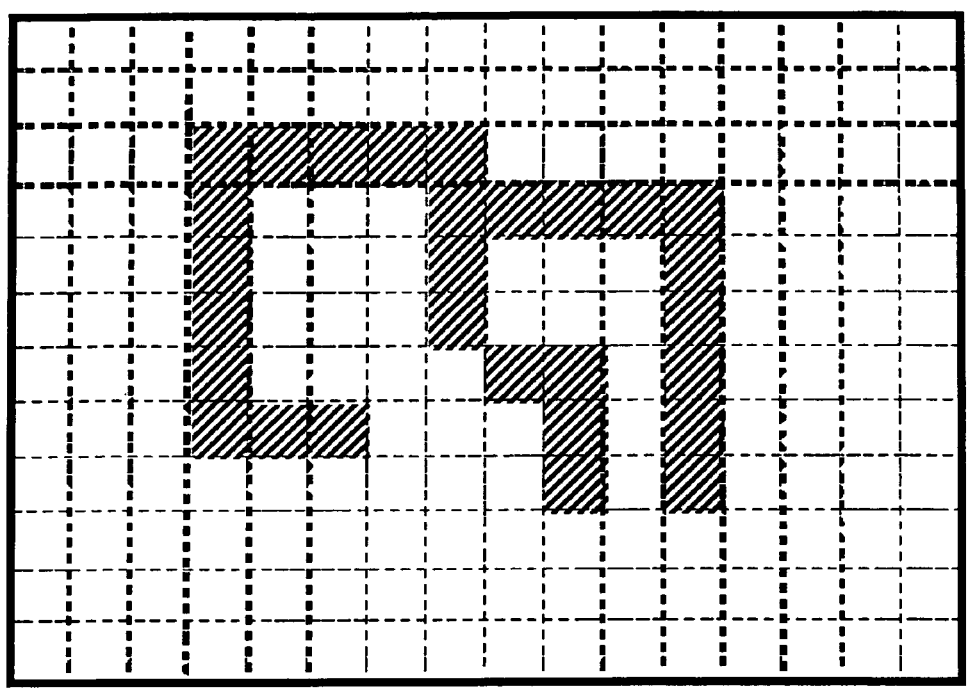
FIG. 21 is an illustration showing the blocks in which the brightness category was changed when a photographing object changes from that shown in FIG. 17 and FIG. 19 to that shown in FIG. 18 and FIG. 20, respectively.

FIG. 19 is an illustration of the blocks shown in FIG. 17 by classifying them into three categories according the brightness data. Similarly, FIG. 20 is an illustration of the blocks shown in FIG. 18 by classifying them into three categories according the brightness data value. The blocks classified into the category A, which are indicated as "A" have the average brightness value of equal to or greater than 184. Similarly, the blocks classified into the category B, which are indicated as "B" have the average brightness value of equal to or greater than 92 and smaller than 184. The blocks classified into the category C, which are indicated as "C" have the average brightness value smaller tan 92 (that is, equal to or smaller than 91). Such a brightness detection is performed, for example, at intervals of 200 msec in response to a timing of performing an automatic exposure (AE) control. The CPU 15 saves the data of the brightness category of each block in the RAM, and compares the data of the brightness category with the data of previous brightness category each time the brightness detection is performed. FIG. 21 is an illustration showing the blocks in which the brightness category was changed when the photographing object changed from that shown in FIG. 17 and FIG. 19 to that shown in FIG. 18 and FIG. 20. FIG. 21 indicates that the brightness category of 28 blocks was changed. The CPU 15 determines that the picturing state was changed and the focused state is not maintained if the number of blocks of which brightness category was changed exceeds 10% of the total.

Figure 22:
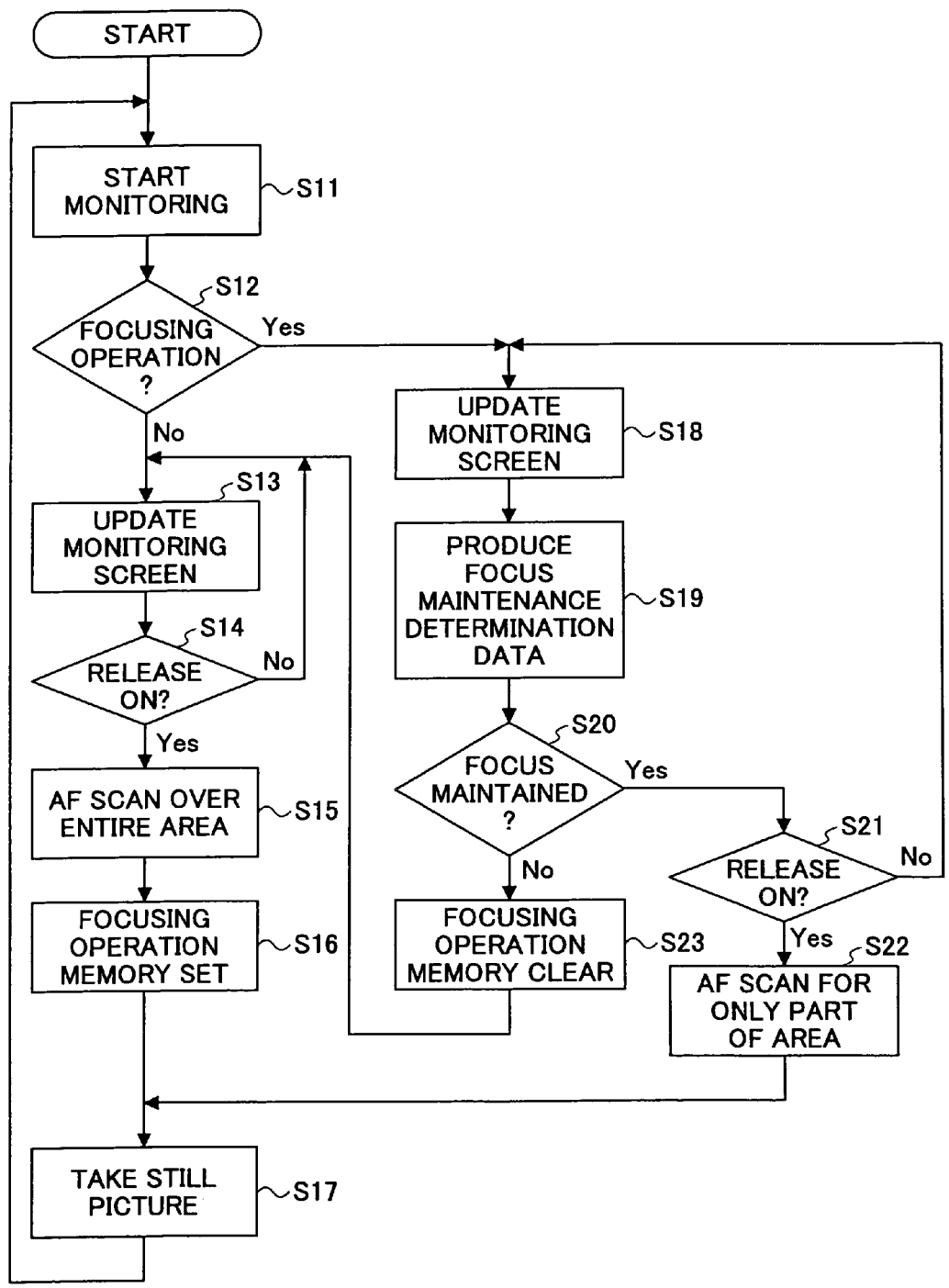
FIG. 22 is a flowchart of a process to change an automatic focus scan range according to whether or not a focused state is maintained.

FIG. 22 is a flowchart of a process to change an automatic focus scan range according to whether or not a focused state is maintained. First, when a monitoring operation is started (step S11), it is determined whether or not a focusing operation has been performed (step S12). The fact whether or not a focusing operation has been performed is stored in the RAM. If a focusing operation is performed, information regarding a flag indicating the execution of the focusing operation is stored, and, thereafter, the information is retained until it is determined that a picturing condition was changed. It should be noted that the information is deleted when the operation is changed into an operation mode other than photographing such as a time of turning on a power or a time of replay. If it is determined, in step S12, that a focusing operation is not performed, the monitoring screen is updated (step S13), wait for turning on the shutter release 201 (step S14). If the shutter release 201 is not turned on, the routine returns to step S13, and the monitoring screen is repeatedly updated until the shutter release 201 is turned on. If the shutter release 201 is turned on, it means a new focusing operation is required, and, thus, an automatic focus is performed by an automatic focus scan on an entire area (step S15). Thereafter, the above-mentioned information regarding execution of the focusing operation is stored (step S16), and, then, a process of taking a still picture is performed (step S17). After taking a picture, the routine returns to step S11 to continue the monitoring operation.

On the other hand, if it is determined, in step S12, that a focusing operation has been performed, the monitoring screen is updated (step S18), and periodically check whether or not the focused state is maintained by detecting a state of photographing. That is, after updating the monitoring screen, data for determining whether or not the focused state is maintained is produced (step S19), and, then, it is determined whether or not the focused state is maintained (step S20). The determination of whether or not the focused state is maintained according to a change in the photographing condition will be explained later with reference to FIG. 23. If it is determined, in step S20, that the focused state is maintained, the routine proceeds to step S21 where it is determined whether or not the shutter release 201 is turned on. If it is determined that the shutter release 201 is turned on, an automatic focus scan is performed on a scan range narrower than a normal range (step S22). If it is determined, in step S21, that the shutter release 201 is not turned on, the routine returns to step S18 so as to repeat the process of updating the monitoring screen (step S18), producing focused state maintenance determination data (step S19) and determining the focused state maintenance (step S20). If it is determined, in step S20, that the focused state is not maintained, the information indicating execution of the focusing operation is cleared (step S23), and the routine proceeds to step S13 where a photographing operation according to an automatic focus scan is performed with a normal entire area to be an object.

Figure 23:
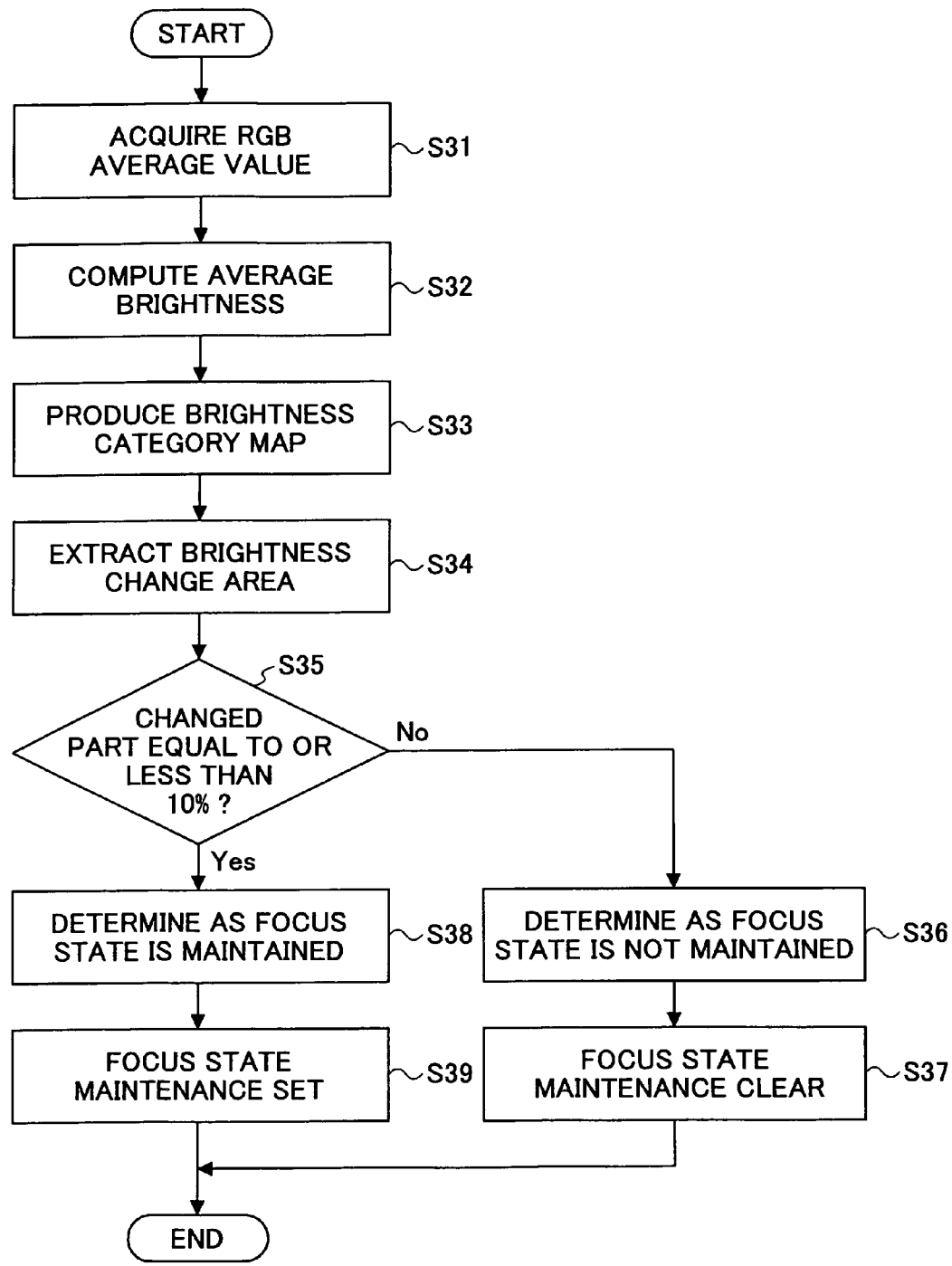
FIG. 23 is a flowchart of a process of determining maintenance of focus in step S20 of FIG. 22 according to a change in a brightness distribution.

FIG. 23 is a flowchart of a process of determining maintenance of focus in step S20 of FIG. 22 according to a change in a brightness distribution. When the monitoring is started, the screen is updated every 1/30 second, and an automatic exposure (AE) is performed at intervals of 200 msec. Since the RGB average values, which are result of averaging of R, G and B, are acquired in the automatic exposure control (step S31), average brightness of each block is calculated by using the acquired RGB average values (step S32). Then, a brightness category map indicating a brightness distribution of the blocks, each of which is produced by dividing the screen and is classified into one of three categories (step S33). The brightness distribution of the blocks classified into three categories was explained with reference to FIGS. 9-12. Then, the current brightness distribution is compared with the last brightness distribution so as to extract blocks of which brightness distribution was changed (step S34). Then, it is determined whether or not a number of blocks of which brightness category was changed exceeds 10% of the total (step S35). If it exceeds 10%, it is determined that the photographing condition was changed (step S36), and the information indicating the focused state is cleared (step S37) and the process is ended. In a subsequent focusing operation, a focus position is acquired by scanning an entire automatic focus scan range.

On the other hand, if it is determined, in step S35, that the number of blocks of which brightness category was changed is equal to or less than 10% of the total and the focused state is maintained (step S38), information indicating the maintenance of the focused state is set (step S39), and, then, the process is ended. In a subsequent automatic focusing operation, a focus position is acquired by scanning only a narrow range near the current focus position. The narrow range near the focus position is set to, for example, 20% of the entire automatic focus scan range. As shown in Table 1, in the case of the wide angle end, since 120 positions are to be subjected to the automatic focus scan, the narrow range near the focus position is 24 positions. Thus, the automatic focus scan is performed on ±12 positions with the current position of the focal lens to be a center. It should be noted that it is preferable to store the various parameters in a non-volatile memory, which is rewritable in a narrow range. The parameters include an interval of acquiring the RGB average values, a threshold value for categorizing the brightness distribution, a number of blocks of which brightness category distribution is changed or a threshold value for determining maintenance of focus of a ratio of the changed blocks, and a ratio of the narrow range near the current focus position.

Figure 24:
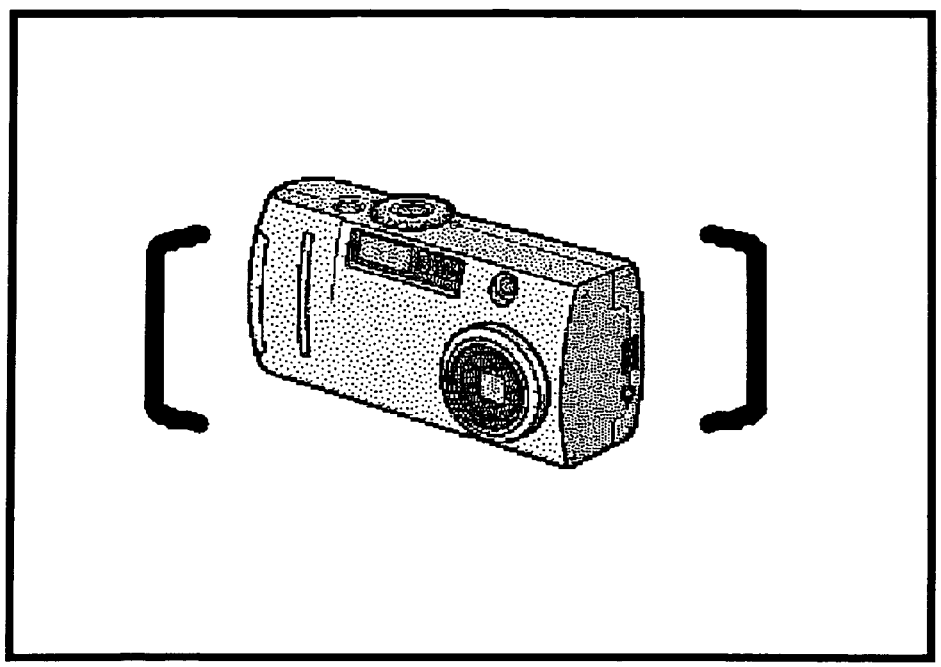
FIG. 24 is an illustration of a screen that shows a range, within which a distance measurement sensor measures a distance.
Figure 25:
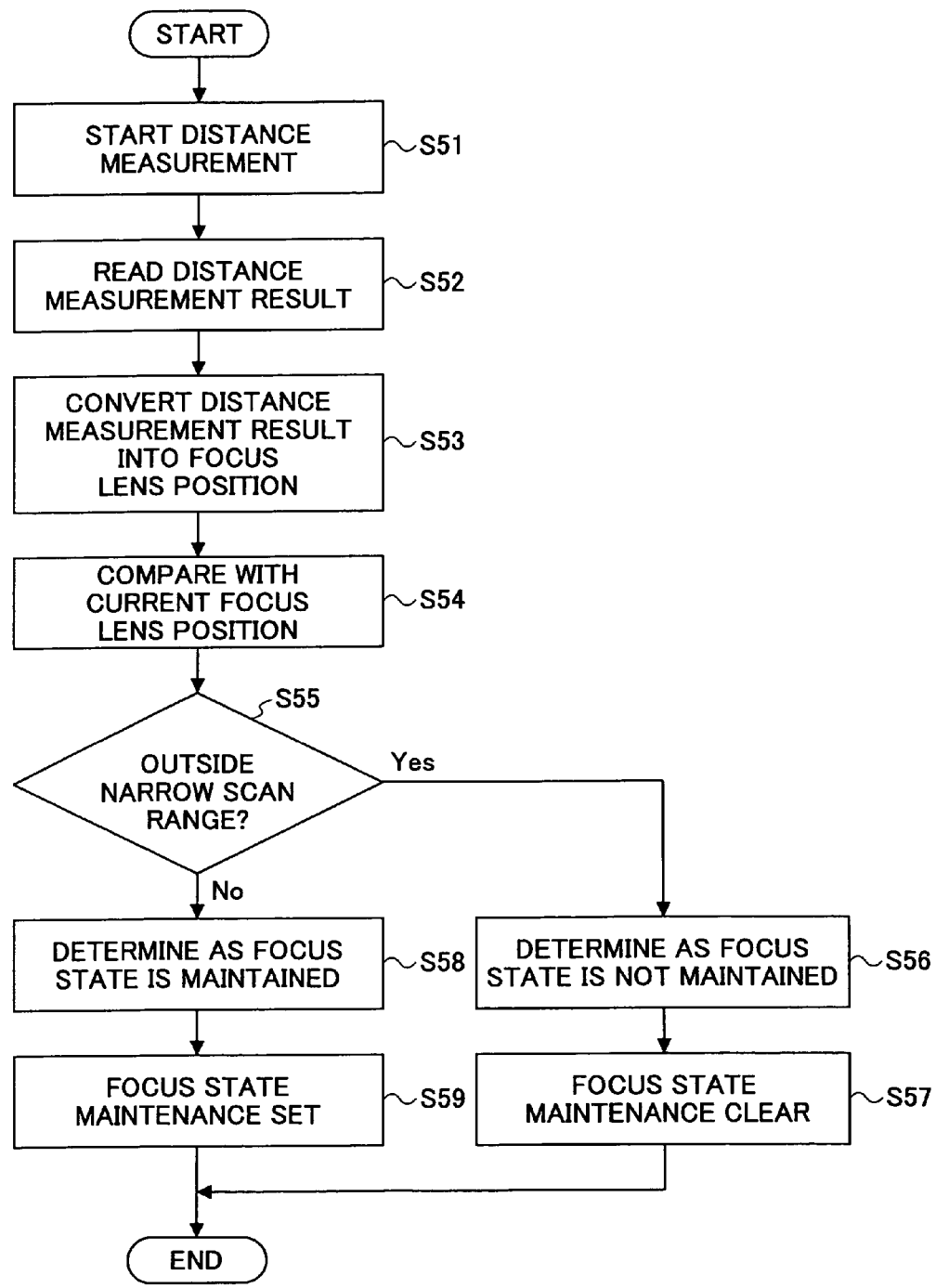
FIG. 25 is a flowchart of a process of step S20 of FIG. 22 to determine whether or not a focused state is maintained using a distance computed by the distance measurement sensor.

As shown in FIG. 3, which is the front view of the camera, the digital still camera according to the present embodiment is provided with the distance measurement unit 105. The distance measurement unit 105 has two optical units arranged side-by-side so that a distance to a photographing object can be calculated based on outputs of the two optical units in accordance of the principal of the triangular surveying method. In the recording mode, a distance measurement operation is repeatedly performed by the distance sensor 23 using the distance measurement unit 105. FIG. 24 shows a range, within which the distance measurement sensor 23 using the distance measurement unit 105 measures a distance, in the screen. The distance computed by the distance measurement sensor 23 is converted into a focal lens position. The data regarding a correspondence relationship between the distance acquired by the distance measurement sensor 23 and the focal lens position is stored in a rewritable non-volatile memory, and the CPU 15 converts the distance computed by the distance measurement sensor 23 into the focal lens position based on the stored data. FIG. 25 is a flowchart of a process of step S20 of FIG. 22 to determine whether or not a focused state is maintained using the distance computed by the distance measurement sensor 23. The switching of the AF scan range after determination of maintenance of the focus state was described with the flowchart of FIG. 22.

When the monitoring is started, a distance measurement operation is performed at intervals almost the same as the intervals for performing the automatic exposure (AE) control (step S51). Although there is a small difference depending on brightness of a photographing object, the distance measurement operation can compute the distance to a photographing object in about 100 msec. The computed distance to the photographing object is read (step S52), and a focal lens position at which the photographing object is focused is acquired by using the conversion table of the focal lens position stored in the rewritable non-volatile memory (step S53). Then, the CPU 15 compares the current position of the focal lens with the focal lens position calculated from the distance to the photographing object by using the distance measurement sensor 23 (step S54). In the present embodiment, the focal lens is controlled, for example, by a stepping motor, and a focal lens position can be known by counting a number of pulses corresponding to the travel of the focal lens from a reference position at a start time. Alternatively, without using a stepping motor, a position of the focal lens can be detected from a resistance value of a resistance plate, which outputs a resistance value corresponding to a focal lens position.

If the difference between the current focal lens position and the focal lens position computed from the distance to the photographing object computed using the distance measurement sensor 23 is larger than the narrow range of the automatic focus scan range (step S55), it is determined that the focus state is not maintained (step S56), and, thus, the information indicating the maintenance of the focus state is cleared (step S57) and the process is ended. In a subsequent focusing operation, a focus position is acquired by scanning the entire automatic focus scan range (step S56). Here, the narrow rage of the automatic focus scan range is, as mentioned before, a scan range used when a focus is maintained and corresponds to a position range of 20% of the entire scan range. At the wide angle end, since the entire range includes 120 positions, 24 positions correspond to the narrow range of the automatic focus scan range. Thus, there is a shift larger than ±12 positions from the current position, it is determined that the focus is not maintained. On the other hand, if it is determined, in step S55, that the result acquired from the distance measurement sensor 23 is within the range of ±12 positions from the current position (step S58), the information indicating the maintenance of the focus state is set (step S59), and the process is ended. In the subsequent automatic focusing operation, a focus position is acquired by scanning only the narrow range near the current focus position.

Figure 26:
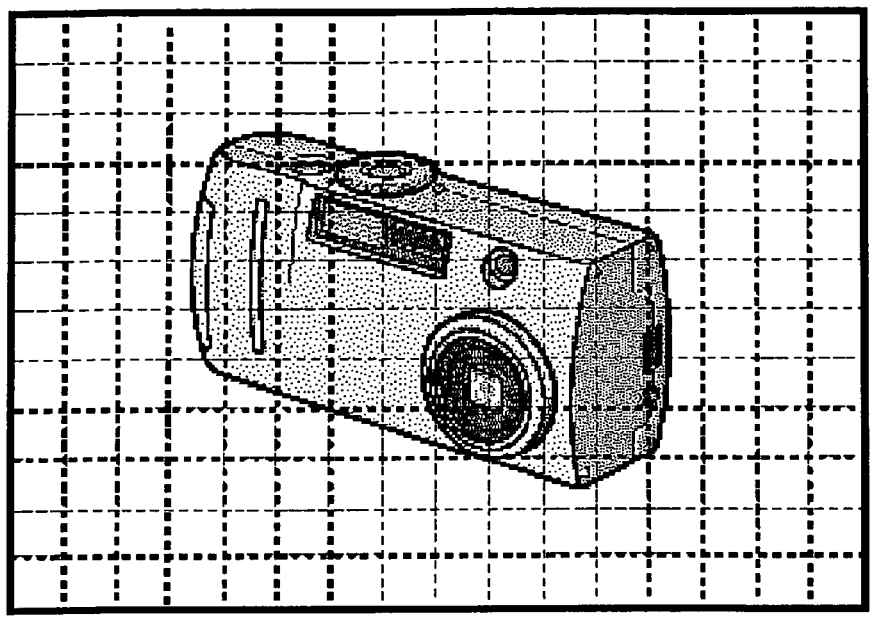
FIG. 26 is an illustration of a screen image immediately after performing an automatic focusing operation.
Figure 27:
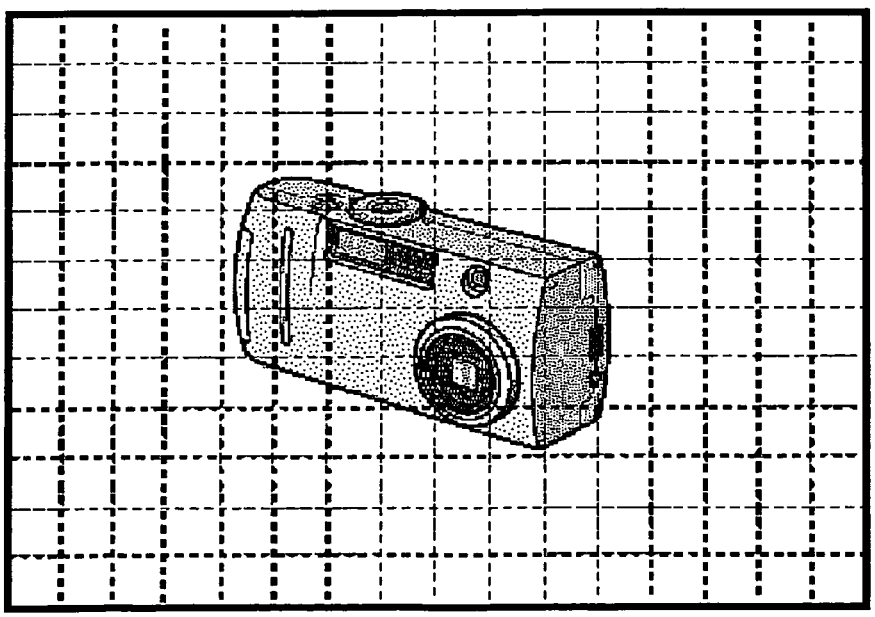
FIG. 27 is an illustration of a screen image in a state where a distance to a photographing object is changed from the state shown in FIG. 26.

FIG. 26 is an illustration of a screen image immediately after performing the automatic focusing operation. FIG. 27 is an illustration of a screen image in a state where a distance to a photographing object is changed from the state shown in FIG. 26. In the present embodiment, the screen is divided into blocks of vertical 12×horizontal 16, and an average value of a difference between adjacent pixels is acquired with respect to G pixels in each block. For example, if 150 pixels are included in one block, 50 pixels are assigned to G pixel since an image is constituted by R, G and B pixels. With respect to the 50 pixels, differences are acquired between adjacent pixels, and sum the acquired differences are summed. The result of the summing is divided by 50, which is the number of pixels, so as to acquire an average of differences of G pixels for each block. In this case, if the G pixel is 8-bit data, the average value of the differences of G pixels is also 8-bit data and its maximum value is 255. The values of G pixels are acquired in the CCD interface 8 shown in the diagram of imaging system of FIG. 13. Here, the fact that the values of G pixels differ greatly between pixels means that the G component changes greatly between the pixels, in other words, there is a high contrast. Namely, acquiring an average of differences of G pixels of each block corresponds to acquiring a contrast for each block. Thus, in the following description, the average of differences of G pixels may be referred to as a contrast.

Figure 28:
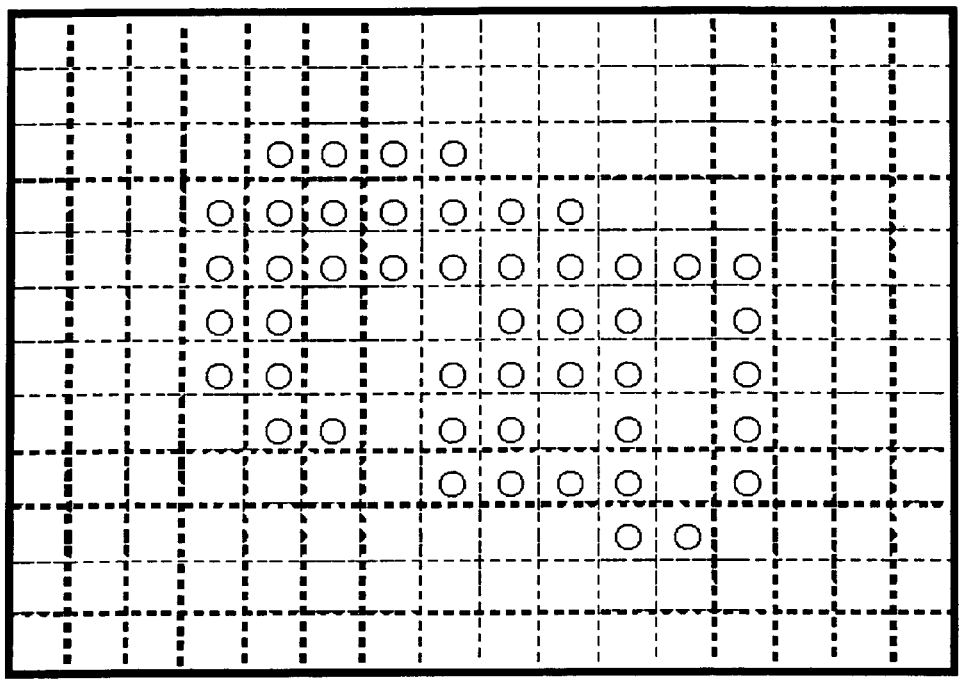
FIG. 28 is an illustration showing a distribution of the blocks of which contrast is a value equal to or greater than a predetermined value in FIG. 26.
Figure 29:
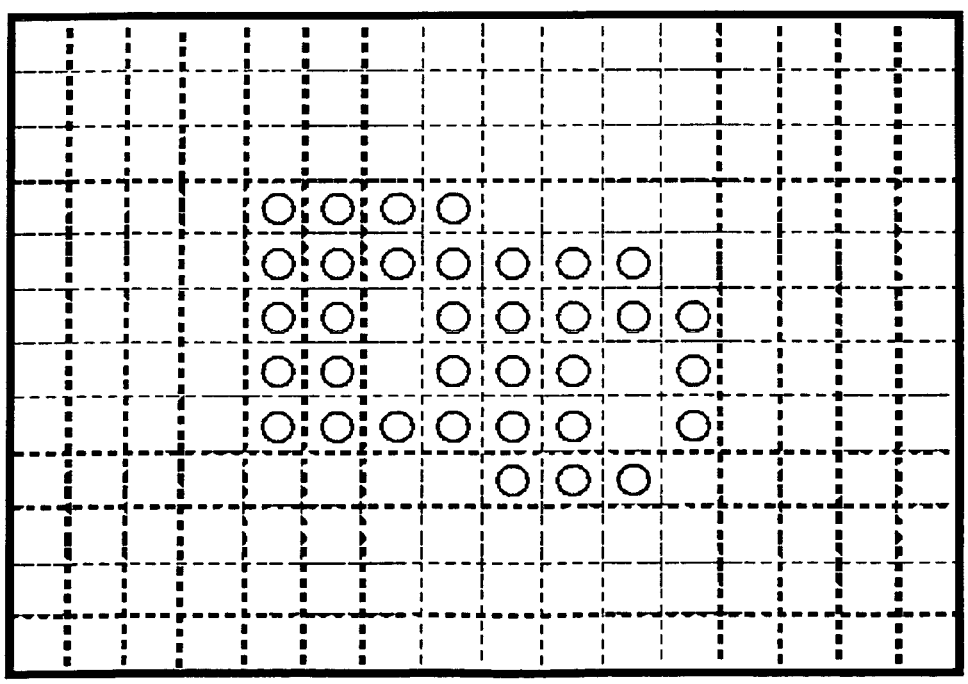
FIG. 29 is an illustration showing a distribution of the blocks of which contrast is a value equal to or greater than a predetermined value in FIG. 27.
Figure 30:
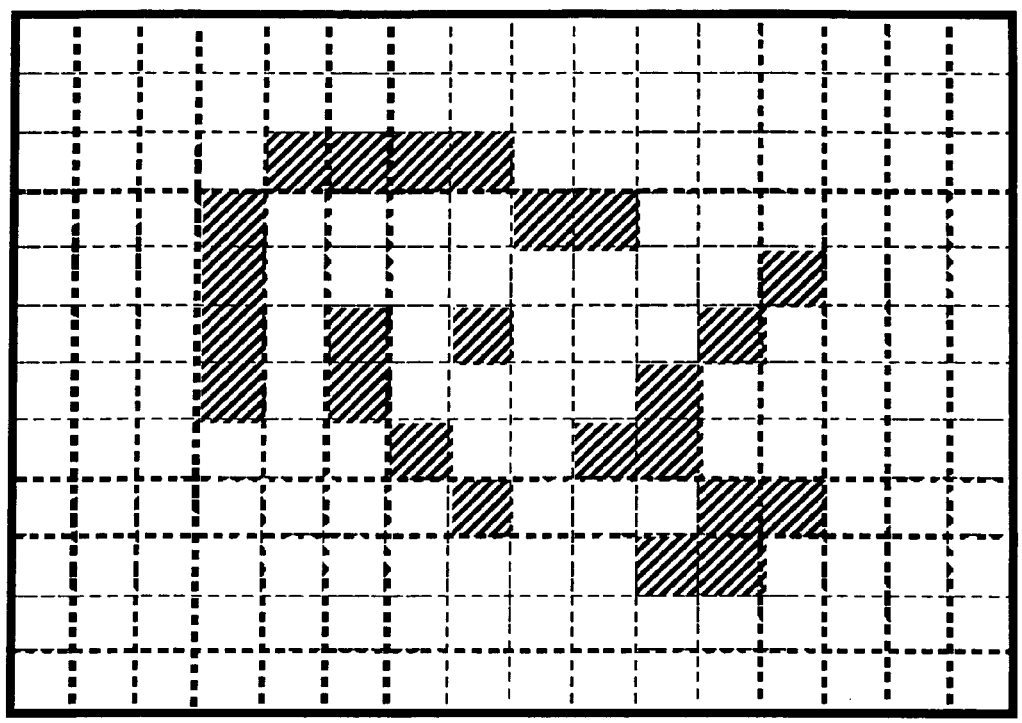
FIG. 30 is an illustration showing blocks in black having a contrast value equal to or greater than 128 of which positions have changed when the state of the photographing object has changed from the state shown in FIG. 26 to the state shown in FIG. 27.

FIG. 28 shows a distribution of the blocks of which contrast is a value equal to or greater than a predetermined value in FIG. 26. FIG. 29 shows similarly a distribution of the blocks of which contrast is a value equal to or greater than a predetermined value in FIG. 27. In the present embodiment, a change in a state of a photographing object is detected according to whether or not a block having a contrast value of equal to or greater than 128 has moved. In FIGS. 28 and 29, portions to which "◯" are given are the blocks having a contrast value of equal to or greater than 128. Also in this case, detection of the contrast for each block is performed at intervals of 200 msec according to the interval for performing the automatic exposure (AE) control. The CPU 15 saves information, which indicates positions of the blocks having a contrast value equal to or greater than 128, in a RAM so as to compare with positions of blocks having a previous contrast value equal to or greater than 128 at the time of detecting a contrast. FIG. 30 shows the blocks in black having a contrast value equal to or greater than 128 of which positions have changed when the state of the photographing object has changed from the state shown in FIG. 26 to the state shown in FIG. 27. In the case of FIG. 30, 34 blocks have changed. When the number of blocks having a contrast value equal to or greater than 128 of which positions have changed exceeds, for example, 10% of the total, the CPU 15 determines that a focus state is not maintained.

Figure 31:
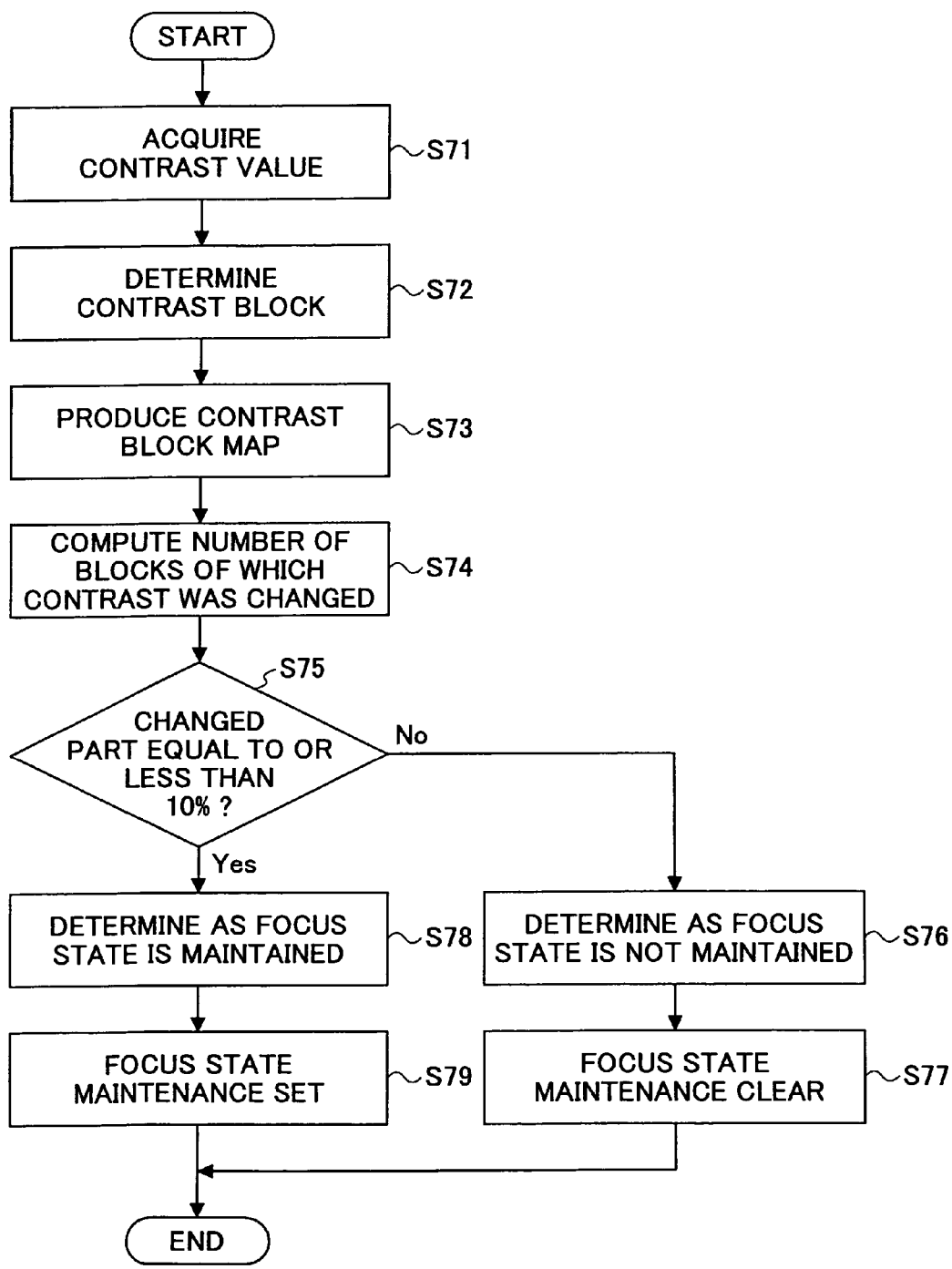
FIG. 31 is a flowchart of a process used for determining whether or not a focused state is maintained by detecting a number of blocks having a contrast value equal to or greater than 128 of which positions have changed.

FIG. 31 is a flowchart of a process used for determining whether or not a focused state is maintained by detecting a number of blocks having a contrast value equal to or greater than 128 of which positions have changed. Switching of the AF scan range after the determination of maintenance of the focused state was explained with reference to the flowchart of FIG. 22. When the monitoring is started, an average of differences of each block, that is, a contrast of each block is detected (step S71) at intervals substantially equal to the intervals 200 ms of the automatic exposure (AE) control, and blocks having a contrast equal to or greater than 128 are determined (step S72). Based on the determination, a contrast block map, which shows a distribution of the blocks having a contrast equal to or greater than 128 is produced (step S73). Then, a current contrast block map is compared with a previous contrast block map, and the number of blocks having a contrast equal to or greater than 128 of which positions have changed is counted (step S74). Here, it is determined whether or not the number of blocks having a contrast equal to or greater than 128 exceeds 10% of the total (step S75). If it is determined that the number of blocks having a contrast equal to or greater than 128 exceeds 10% of the total, it is determined that the focused state is not maintained and the photographing state has changed (step S76). Thus, information indicating maintenance of the focused state is cleared (step S77), and the process is ended. In a subsequent focusing operation, a focal position is acquired by scanning the entire automatic focus scan range. On the other hand, if it is determined that the number of blocks having a contrast equal to or greater than 128 is less than 10% of the total, it is determined that the focused state is maintained and the photographing state has changed (step S78). Thus, information indicating maintenance of the focused state is set (step S79), and the process is ended. In a subsequent focusing operation, a focal position is acquired by scanning only a narrow range near the current focal position.

The present invention is not limited to the specifically disclosed embodiments, and variations and modifications may be made without departing from the scope of the present invention.

The present application is based on Japanese priority applications No. 2004-007154 filed Jan. 14, 2004 and No. 2004-166442 filed Jun. 3, 2004, the entire contents of which are hereby incorporated herein by reference.

What is claimed is:

1. An imaging apparatus, comprising:
   focus control means for sequentially detecting a focal point while moving a focal lens to each of a plurality of positions and stopping the focal lens at the focal point so as to perform an automatic focusing operation; and
   range control means for causing said focus control means to perform the automatic focusing operation by limiting a movable range of the focal lens to a range narrower than an entire focus range with an immediately preceding focal point so as to include a smaller number of the positions, when, at a time of taking a picture, the number of the positions to be used by the focus control means to move the focal lens for detecting the focal point is larger than a predetermined number and a predetermined condition is satisfied, wherein
   said range control means causes said focus control means to perform the automatic focusing operation by the entire focus range including the number of the positions, when, at the time of taking the picture, at least one of a following criteria is satisfied, the number of the positions to be used by the focus control means to move the focal lens for detecting the focal point is smaller than the predetermined number and the predetermined condition is not satisfied.

2. The imaging apparatus as claimed in claim 1, wherein said predetermined condition includes that said automatic focusing operation was performed at least one time after a macro mode for setting a photographing range to a distance range shorter than a predetermined range was set, and
   said range control means includes means for causing said focusing operation to be performed on said limited range when the predetermined condition is satisfied.

3. The imaging apparatus as claimed in claim 1, wherein said range control means includes:
   means for monitoring a focus state in said focus control means; and
   means for causing the focusing operation on said limited range when the predetermined condition is satisfied, the predetermined condition including that a focus state after an immediately preceding focusing operation is maintained based on said means for monitoring.

4. The imaging apparatus as claimed in claim 1, further comprising distance measurement means for measuring a distance to a photographing object, wherein said range control means comprises:
   means for monitoring a change in the distance measured by said distance measurement means; and
   means for causing the focusing operation on said limited range when the predetermined condition is satisfied, the predetermined condition including that the change in the distance after an immediately preceding automatic focusing operation is equal to or less than a predetermined value based on the monitoring by said means for monitoring.

5. The imaging apparatus as claimed in claim 1, further comprising brightness distribution measuring means for measuring a brightness distribution in a picture screen, wherein said range control means comprises:
   means for monitoring a change in the brightness distribution measured by said brightness distribution measuring means; and
   means for causing the focusing operation on said limited range when the predetermined condition is satisfied, the predetermined condition including that the change in the brightness distribution after an immediately preceding automatic focusing operation is equal to or less than a predetermined amount based on the monitoring by said means for monitoring.

6. The imaging apparatus as claimed in claim 1, further comprising an imaging optical system using a zoom optical system that optically changes a zoom magnification, wherein said range control means comprises:
   means for monitoring a change in the zoom magnification in said imaging optical system; and
   means for causing the focusing operation to be performed on an entire focus range when the zoom magnification has changed based on the monitoring of said means for monitoring.

7. The imaging apparatus as claimed in claim 1, wherein when a macro mode is set, the number of the positions to be used by the focus control means to move the focal lens for detecting the focal point is larger than the predetermined number.

8. An imaging apparatus, comprising:

focus control means for sequentially moving a focal lens to each of a plurality of positions and acquiring from an image signal an automatic focus evaluation value, which is acquired in correspondence with sharpness of an edge portion of a photographing object image, and stopping said focal lens at a focal point being set to a maximum point of the automatic focus evaluation value so as to perform an automatic focusing operation; and range control means for causing said focus control means to perform the automatic focusing operation by limiting a movable range of the focal lens to a range narrower than an entire focus range with an immediately preceding focal point so as to include a smaller number of the positions, when, at a time of taking a picture, the number of the positions to be used by the focus control means to move the focal lens for acquiring the automatic focus evaluation value is larger than a predetermined number and a predetermined condition is satisfied, wherein said range control means causes said focus control means to perform the automatic focusing operation by the entire focus range including the number of the positions, when, at the time of taking the picture, at least one of a following criteria is satisfied, the number of the positions to be used by the focus control means to move the focal lens for acquiring the automatic focus evaluation value is smaller than the predetermined number and the predetermined condition is not satisfied.

9. The imaging apparatus as claimed in claim 8, wherein said predetermined condition includes that said automatic focusing operation was performed at least one time after a macro mode for setting a photographing range to a distance range shorter than a predetermined range was set, and said range control means includes means for causing said focusing operation to be performed on said limited range when the predetermined condition is satisfied.

10. The imaging apparatus as claimed in claim 8, wherein said range control means includes:

means for monitoring a focus state in said focus control means; and means for causing the focusing operation on said limited range when the predetermined condition is satisfied, the predetermined condition including that a focus state after an immediately preceding focusing operation is maintained based on said means for monitoring.

11. The imaging apparatus as claimed in claim 8, further comprising distance measurement means for measuring a distance to a photographing object, wherein said range control means comprises:

means for monitoring a change in the distance measured by said distance measurement means; and means for causing the focusing operation on said limited range when the predetermined condition is satisfied, the predetermined condition including that the change in the distance after an immediately preceding automatic focusing operation is equal to or less than a predetermined value based on the monitoring by said means for monitoring.

12. The imaging apparatus as claimed in claim 8, further comprising brightness distribution measuring means for measuring a brightness distribution in a picture screen, wherein said range control means comprises:

means for monitoring a change in the brightness distribution measured by said brightness distribution measuring means; and means for causing the focusing operation on said limited range when the predetermined condition is satisfied, the predetermined condition including that the change in the brightness distribution after an immediately preceding automatic focusing operation is equal to or less than a predetermined amount based on the monitoring by said means for monitoring.

13. The imaging apparatus as claimed in claim 8, wherein said range control means comprises:

means for monitoring the automatic focus evaluation value in said focus control means; and means for causing the focusing operation on said limited range when the predetermined condition is satisfied, the predetermined condition including that a change in the automatic focus evaluation value after an immediately preceding automatic focusing operation is equal to or less than a predetermined value based on the monitoring by said means for monitoring.

14. The imaging apparatus as claimed in claim 8, further comprising an imaging optical system using a zoom optical system that optically changes a zoom magnification, wherein said range control means comprises:

means for monitoring a change in the zoom magnification in said imaging optical system; and means for causing the focusing operation to be performed on an entire focus range when the zoom magnification has changed based on the monitoring of said means for monitoring.

15. The imaging apparatus as claimed in claim 8, wherein when a macro mode is set, the number of the positions to be used by the focus control means to move the focal lens for detecting the focal point is larger than the predetermined number.

16. A focus control method, comprising:

performing an automatic focusing operation by sequentially detecting a focal point while moving a focal lens to each of a plurality of positions, which constitutes at least a part of an imaging optical system of said imaging apparatus, and stopping the focal lens at the focal point; and causing said automatic focusing operation to be performed by limiting a movable range of the focal lens to a range narrower than an entire focus range with an immediately preceding focal point set as a reference, so as to include a smaller number of the positions, when, at a time of taking a picture, the number of the positions to be used to move the focal lens for detecting the focal point is larger than a predetermined number and a predetermined condition is satisfied; and causing said automatic focusing operation to be performed by the entire focus range including the number of the positions, when, at the time of taking the picture, at least one of a following criteria is satisfied, the number of the positions to be used to move the focal lens for detecting the focal point is smaller than the predetermined number and the predetermined condition is not satisfied.

17. A focus control method, comprising:

sequentially moving a focal lens to each of a plurality of positions and acquiring from an image signal an automatic focus evaluation value, which is acquired in correspondence to sharpness of an edge portion of a photographing object image while moving a focal lens, which constitutes at least a part of an imaging optical system;

controlling an automatic focusing operation by stopping said focal lens at a focal point set as a maximum point of the automatic focus evaluation value; and causing said automatic focusing operation to be performed by limiting a movable range of the focal lens to a range narrower than an entire focus range with an immediately preceding focal point set as a reference, so as to include a smaller number of the positions, when, at a time of taking a picture, the number of the positions to be used to move the focal lens for acquiring the automatic focus evaluation value is larger than a predetermined number and a predetermined condition is satisfied; and causing said automatic focusing operation to be performed by the entire focus range including the number of the positions, when, at the time of taking the picture, at least one of a following criteria is satisfied, the number of the positions to be used to move the focal lens for acquiring the automatic focus evaluation value is smaller than the predetermined number and the predetermined condition is not satisfied.

18. A computer readable recording medium storing a program for causing a computer to perform a focus control method comprising:

performing an automatic focusing operation by sequentially detecting a focal point while moving a focal lens to each of a plurality of positions, which constitutes at least a part of an imaging optical system of said imaging apparatus, and stopping the focal lens at the focal point; and causing said automatic focusing operation to be performed by limiting a movable range of the focal lens to a range narrower than an entire focus range with an immediately preceding focal point set as a reference, so as to include a smaller number of the positions, when, at a time of taking a picture, the number of the positions to be used to move the focal lens for detecting the focal point is larger than a predetermined number and a predetermined condition is satisfied; and causing said automatic focusing operation to be performed by the entire focus range including the number of the positions, when, at the time of taking the picture, at least one of a following criteria is satisfied, the number of the positions to be used to move the focal lens for detecting the focal point is smaller than the predetermined number and the predetermined condition is not satisfied.

19. A computer readable recording medium storing a program for causing a computer to perform a focus control method comprising:

sequentially moving a focal lens to each of a plurality of positions and acquiring from an image signal an automatic focus evaluation value, which is acquired in correspondence to sharpness of an edge portion of a photographing object image while moving a focal lens, which constitutes at least a part of an imaging optical system;

controlling an automatic focusing operation by stopping said focal lens at a focal point set as a maximum point of the automatic focus evaluation value; and causing said automatic focusing operation to be performed by limiting a movable range of the focal lens to a range narrower than an entire focus range with an immediately preceding focal point set as a reference, so as to include a smaller number of the positions, when, at a time of taking a picture, the number of the positions to be used to move the focal lens for acquiring the automatic focus evaluation value is larger than a predetermined number and a predetermined condition is satisfied; and causing said automatic focusing operation to be performed by the entire focus range including the number of the positions, when, at the time of taking the picture, at least one of a following criteria is satisfied, the number of the positions to be used to move the focal lens for acquiring the automatic focus evaluation value is smaller than the predetermined number and the predetermined condition is not satisfied.

20. An imaging apparatus, comprising:

a detecting unit configured to sequentially detect a focal point while moving a focal lens to each of a plurality of positions and stopping the focal lens at the focal point so as to perform an automatic focusing operation; and a controller configured to cause the detecting unit to perform the automatic focusing operation by limiting a movable range of the focal lens to a range narrower than an entire focus range with an immediately preceding focal point, so as to include a smaller number of the positions, when, at a time of taking a picture, the number of the positions to be used by the detecting unit to move the focal lens to detect the focal point is larger than a predetermined number and a predetermined condition is satisfied, wherein the controller is further configured to cause the detecting unit to perform the automatic focusing operation by the entire focus range including the number of the positions, when, at the time of taking the picture, at least one of a following criteria is satisfied, the number of the positions to be used by the detecting unit to move the focal lens to detect the focal point is smaller than the predetermined number and the predetermined condition is not satisfied.

21. An imaging apparatus, comprising:

an acquisition unit configured to sequentially move a focal lens to each of a plurality of positions and to acquire from an image signal an automatic focus evaluation value, which is acquired in correspondence with a sharpness of an edge portion of a photographing object image, and to stop the focal lens at a focal point set to a maximum point of the automatic focus evaluation value so as to perform an automatic focusing operation; and a controller configured to cause the acquisition unit to perform the automatic focusing operation by limiting a movable range of the focal lens to a range narrower than an entire focus range with an immediately preceding focal point so as to include a smaller number of the positions, when, at a time of taking a picture, the number of the positions to be used by the acquisition unit to move the focal lens to acquire the automatic focus evaluation value is larger than a predetermined number and a predetermined condition is satisfied, wherein the controller is further configured to cause the acquisition unit to perform the automatic focusing operation by the entire focus range including the number of the positions, when, at the time of taking the picture, at least one of a following criteria is satisfied, the number of the positions to be used by the acquisition unit to move the focal lens to acquire the automatic focus evaluation value is smaller than the predetermined number and the predetermined condition is not satisfied.

* * * * *